United States Patent [19]

Masuda et al.

[11] Patent Number: 5,043,596
[45] Date of Patent: Aug. 27, 1991

[54] CLOCK SIGNAL SUPPLYING DEVICE HAVING A PHASE COMPENSATION CIRCUIT

[75] Inventors: Noboru Masuda, Kokubunji; Hiroyuki Itoh, Kodaira; Bunichi Fujita; Seiichi Kawashima, both of Hadano; Shuichi Ishii, Sayama, all of Japan

[73] Assignee: Hitachi, Ltd., Tokyo, Japan

[21] Appl. No.: 395,958

[22] Filed: Aug. 18, 1989

[30] Foreign Application Priority Data

Sep. 14, 1988 [JP] Japan .................................. 63-228684

[51] Int. Cl.<sup>5</sup> .......................... H03K 5/00; H03K 5/13
[52] U.S. Cl. .................................... 307/262; 307/269; 328/155; 328/63; 328/72
[58] Field of Search ...................... 328/63, 72, 55, 155; 307/269, 262, 511

[56] References Cited

U.S. PATENT DOCUMENTS

| 4,280,099 | 7/1981 | Rattlingourd | 328/155 |
| 4,308,649 | 1/1982 | Naito | 328/155 |
| 4,373,204 | 2/1983 | Brooks | 307/269 |
| 4,461,014 | 7/1984 | Fujino | 328/155 |
| 4,577,163 | 3/1986 | Culp | 331/25 |

FOREIGN PATENT DOCUMENTS 61-39619  2/1986  Japan .
61-39650  2/1986  Japan .

OTHER PUBLICATIONS

Blum, "Automatic Adjustment of Several Decentrally Generated Clock Pulse . . .", IBM Tech. Dis. Bulletin, vol. 24, No. 2, Jul. 1981, pp. 895-897.

Anceau, "A Synchronous Approach for Clocking VLSI Systems", IEEE Journal of SSC, vol. SC-17, No. 1, Feb. 1982, pp. 51-56.

Primary Examiner—Timothy P. Callahan
Attorney, Agent, or Firm—Antonelli, Terry, Stout & Kraus

[57] ABSTRACT

The present invention relates to a clock signal supplying device provided with an automatic phase regulating function for preventing errors in the phase regulation due to noise. In the device according to the present invention, there is disposed a reference signal serving as a phase reference, and transmission lines for clock signals and a transmission line for the reference signal are disposed from a clock signal supplying source to devices which are destinations of the distribution of clock signals. The transmission line for the reference signal is adjusted in advance so as to produce no skew. In the device, which is the destination of distribution of the clock signal, there is disposed a variable delay circuit for regulation of the phase of the clock signal and a phase comparing circuit for comparing the output of the variable delay circuit with the phase of the reference signal to output the result of the comparison. In the device according to the present invention, a noise filter is provided which detects phase regulation errors to effect correct phase regulation. Furthermore, the phase regulation is effected while avoiding a period of time wherein noise is apt to be produced.

23 Claims, 22 Drawing Sheets

PHASE COMPARING CIRCUIT 52

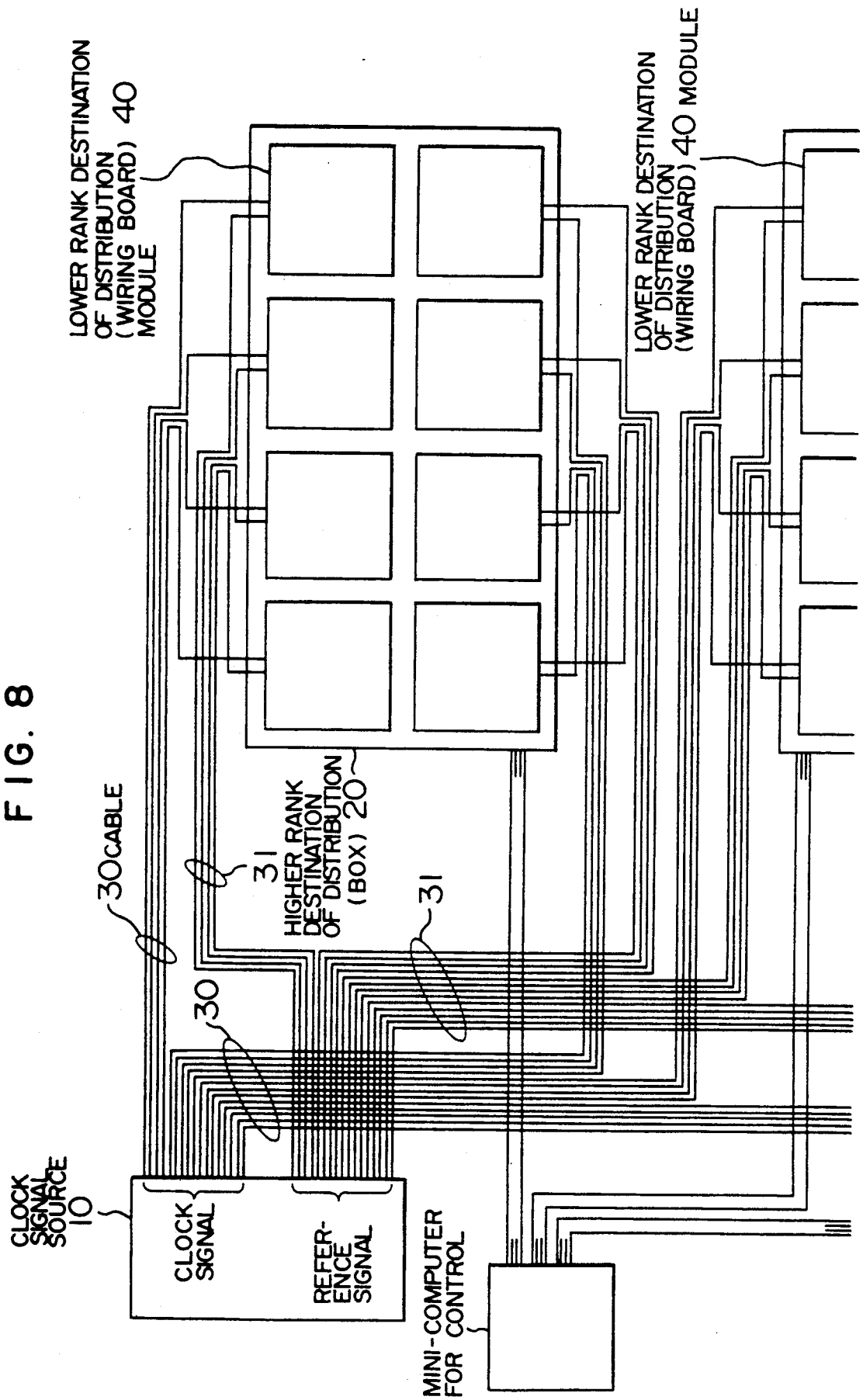

FREQUENCY DIVIDER 12

WAVE-SHAPING CIRCUIT

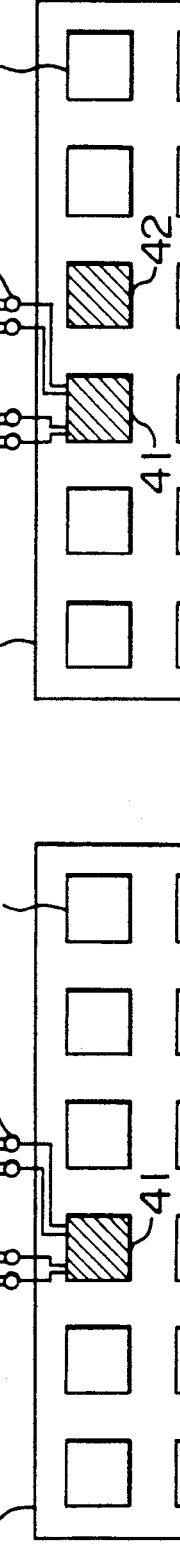

TEMPERATURE DETECTING CIRCUIT 160

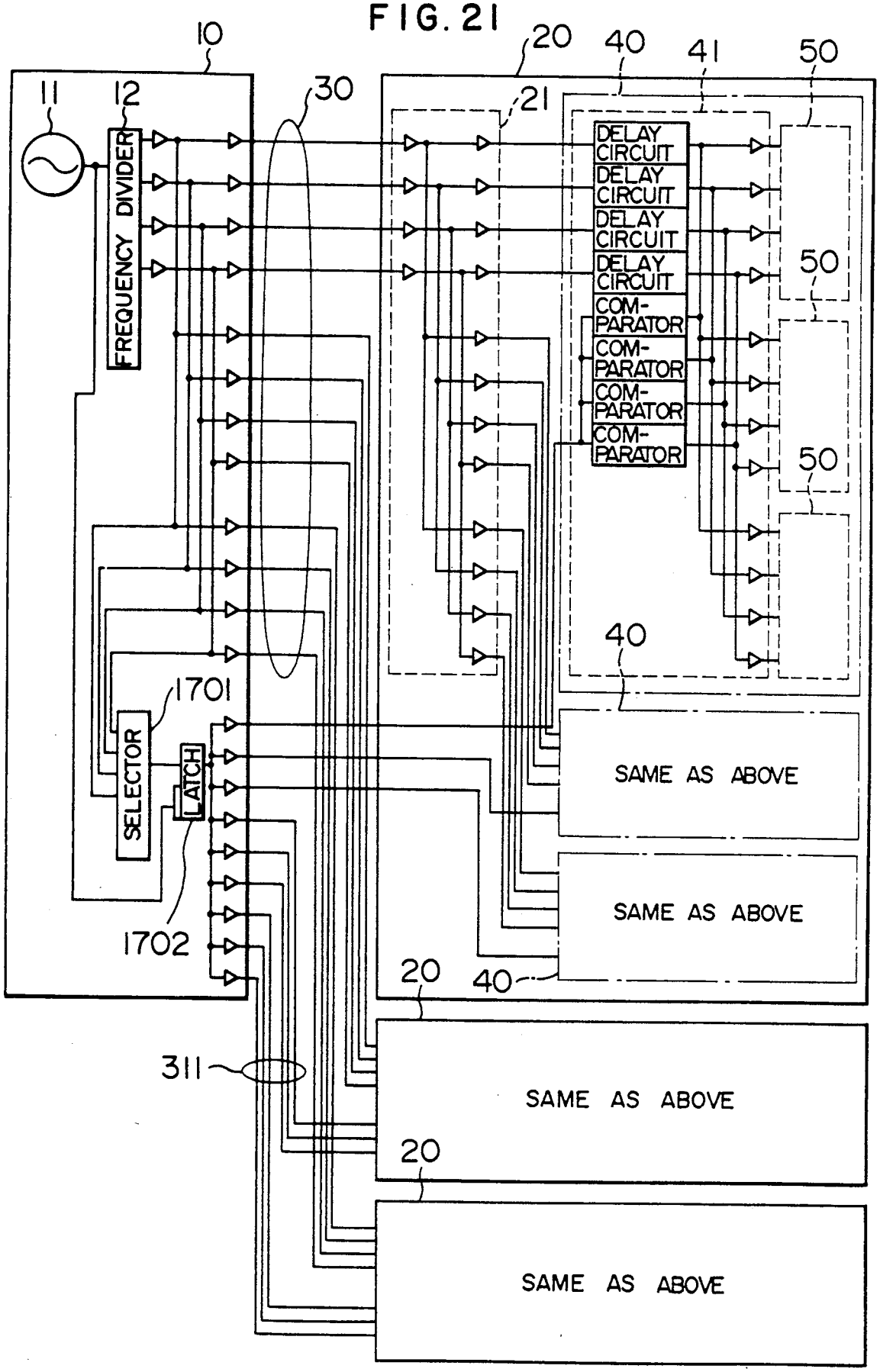

CLOCK SIGNAL SUPPLYING DEVICE HAVING A PHASE COMPENSATION CIRCUIT

CROSS-REFFERENCE TO RELATED APPLICATIONS

The present invention relates to an improvement of the invention disclosed in the co-pending patent application Ser. No. 152,916, filed Feb. 5, 1988.

BACKGROUND OF THE INVENTION

The present invention relates to a clock signal supplying device use in an electronic computer, etc., and in particular, to a clock signal supplying device suitably used for a clock supplying system in a large scale electronic computer dealing with high speed operations.

FIG. 1 shows a prior art example of the clock signal supplying device used in an electronic computer, in which reference numeral 10 is a clock signal generating section; 20 is a device to which clock signals are distributed; and 30 represents cables connecting section 10 and device 20. Further, 40 is a lower rank destination of distribution disposed in a destination of distribution 20, and 50 is a further lower rank destination of distribution disposed in the lower rank destination of distribution 40 in which there are disposed still further terminal destinations of distribution. Concretely speaking, 20 is a box; 40 is a wiring board (module); 50 is an LSI chip; and the terminal destinations of distribution are flipflops. This device divides an original clock signal extracted from a high frequency oscillator 11 into clock signals having a predetermined frequency and a predetermined number of phases as needed by making the original clock signal pass through a frequency divider 12 and distributing the divided signal to the terminal destinations of distribution through several stages of buffer LSIs such as 13, 21, 41, etc., cables 30, etc. It there are fluctuations in the signal propagation time in the buffer circuits and the cables, they appear in each destination of distribution as fluctuations in the phase of the clock signal (called also clock skew). Since a great clock skew prevents the raising the speed of the electronic computer, it is necessary to reduce the clock skew by regulating the phase by some method.

As a prior art phase regulation method for a clock signal in a large scale electronic computer, it was a usual practice that the waveform of the clock signal in each of destinations of the distribution was observed by means of an oscilloscope, etc., and the phase was adjusted to a predetermined value, e.g., by manually exchanging a delay element 14 in FIG. 1.

Further, a method by which exchange of the delay element is made unnecessary by varying the delay time by means of a control signal is disclosed in a Japanese patent application, JP-A-61-39650, filed July 28, 1984 by Fujitsu Limited and laid open Feb. 25, 1986.

Additionally, as a method by which no oscilloscope is used, another method is disclosed in a Japanese patent application, JP-A-61-39619 filed July 30, 1984 by Nihon Electric Co., Ltd., and laid open Feb. 25, 1986, in which a ring oscillator composed of a clock supplying circuit is used, and the oscillation frequency thereof is adjusted to a predetermined value while detecting the signal delay time of the clock supplying circuit therefrom.

In the case where the phase regulation of the clock signal is effected by means of an oscilloscope, etc., the regulation is fairly tedious, and therefore it is not possible to increase by much the number of positions to be regulated. Consequently, after the phase has been regulated at a restricted number of relay positions, the signal cannot help being transmitted therefrom to the terminal destinations of distribution without phase regulations. The fluctuations in the signal propagation time for the part transmitted without phase regulation form a decrease limit in the clock skew. Further, since reflection, attenuation in the amplitude, etc. produced in the cable become remarkable with the increasing frequency of the clock signal, the phase regulation of the clock signal having a high frequency was originally difficult.

For example, in FIG. 1, the cable 30 from the clock source 10 to each of the destinations of distribution 20 in the large scale electronic computer is necessarily about 2 to 4 m, because the box cannot be too small. On the other hand, since the clock source cannot be too large, the outer diameter of the cable is limited to a size smaller than about 2 to 3 mm. When a clock signal having a frequency higher than about 100 MHz is transmitted through such a cable, attenuation appears in the amplitude of the signal. In particular, if the frequency exceeds several hundreds of MHz, the amplitude of the signal is reduced by below about one half. Together with this, the phase regulation of the clock signal becomes more difficult.

Further, in the case where a buffer LSI chip is exchanged because of trouble, etc., the phase regulation should be reexecuted every time.

By the method disclosed in JP-A-61-39650, although the delay element should not be exchanged every time, it is necessary to observe whether the clock signal has a desired phase or not. Further, since the delay time is controlled by regulating an analog voltage, if this control voltage is varied by noise, this appears as a clock skew.

On the other hand, by the method disclosed in JP-A-61-39619, it is necessary to make all the propagation times uniform in signal paths for feeding back the signal from the destinations of distribution to the initial input point, and finally, the clock skew is not finally reduced, and less propagation times are made uniform in a number of signal paths.

SUMMARY OF THE INVENTION

The present invention relates to a clock signal supplying device for automatically effecting the phase regulation of the clock signal so that there is no clock skew. An object of the present invention is to provide an improved clock signal supplying device in which no regulation errors are produced by influences of various noise types at the phase regulation of the clock signal.

In the device according to the present invention, there is disposed a reference signal serving as a phase reference, and therefore, from a device, which is the clock signal supplying source, to another device, which is a destination of distribution of the clock signal, there are disposed a transmission line for the clock signal and a transmission line for the reference signal. The transmission line for the reference signal is previously adjusted so that no skew is produced. (For example, the frequency of the reference signal is set at a low value for which the phase regulation is easily accomplished, and all the transmission lines for the reference signal are made uniform in phase by keeping them in the load condition and the length in accordance with each other.) In the device, which is the destination of distribution of the clock signal, there is disposed a variable delay circuit for regulating the phase of the clock signal and a phase comparing circuit for comparing the output of the variable delay circuit with the phase of the reference signal to output the result of the comparison and the amount of delay by the variable delay circuit is controlled, responding to the output of the phase comparing circuit. When there is disturbance due to noise from the exterior or the interior during the phase regulation, there is a fear that errors are produced in the amount of the phase regulation. In the device according to the present invention, however, noise filter is provided which detects phase regulation errors to effect correct phase regulation. Furthermore, the phase regulation is effected while avoiding a period of time where noises are apt to be produced.

According to the present invention, if only the reference signal having a frequency for which the phase regulation can be effected relatively easily, has been regulated in the phase which a high precision, the other phase are regulated automatically. Therefore, it is possible to regulate the phase with high precision up to a relay point closer to the terminal destinations and to reduce the clock skew. Further, since the phase reference is transmitted to the relay point closer to the terminal destinations through one signal path, it is possible also to reduce the clock skew between different phases. In this way, it is possible to adjust the clock signal to the correct phase by detecting errors in the output of the phase comparing circuit.

BRIEF DESCRIPTION OF THE DRAWINGS

FIG. 8 is a scheme illustrating the whole construction of another embodiment of the clock signal supplying device according to the present invention;

FIGS. 15A and 15B are schemes showing examples of the connection of a signal cable with an LSI chip;

FIG. 21 is a scheme illustrating the construction of still another embodiment of the present invention;

DESCRIPTION OF THE PREFERRED EMBODIMENTS

Figure 2:
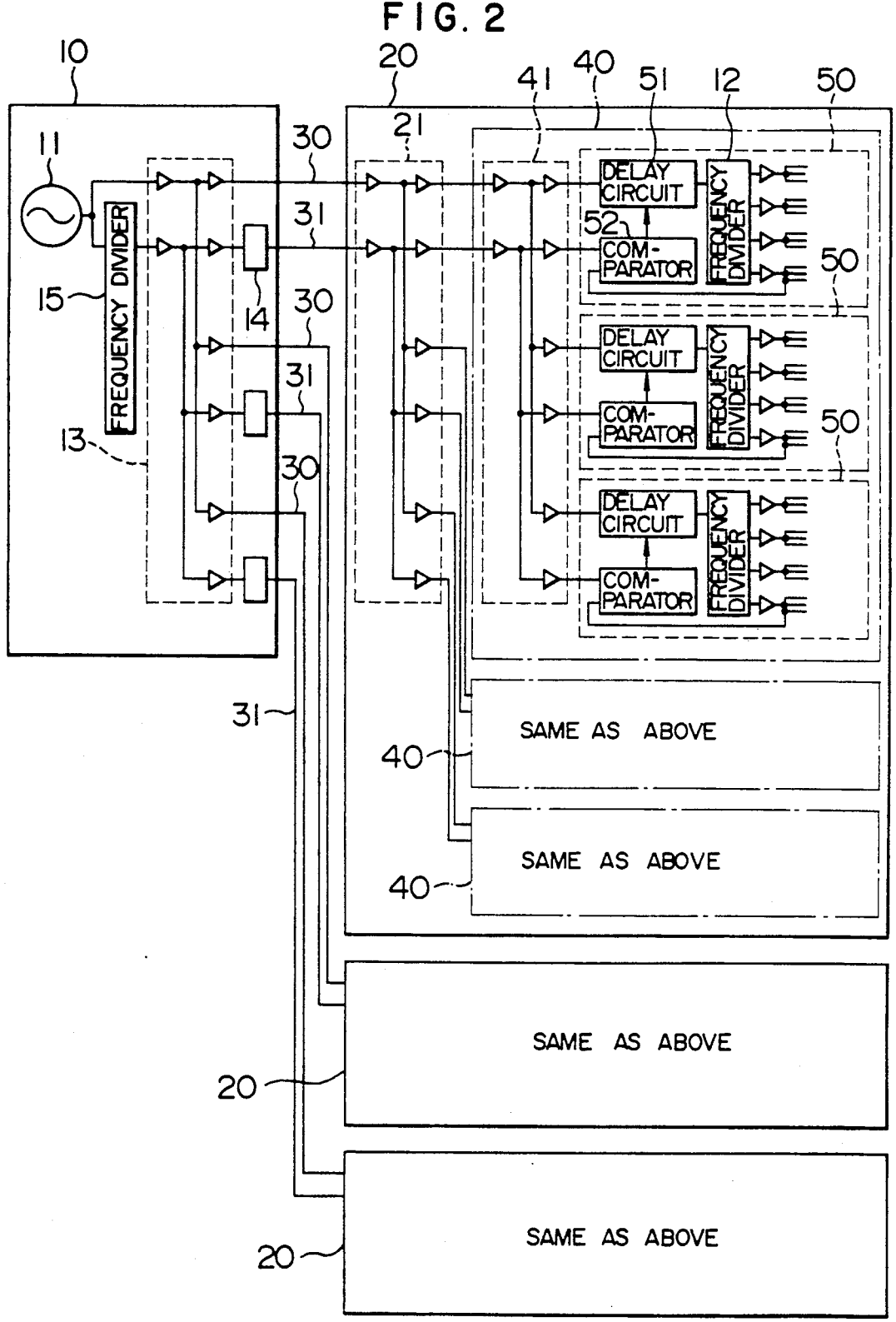
FIG. 2 is a scheme illustrating the whole construction of an embodiment of the clock signal supplying device according to the present invention.

Hereinbelow an embodiment of the present invention will be explained. FIG. 2 is a scheme illustrating the whole construction of the embodiment of the present invention, in which reference numeral 10 is a clock signal generating section; 20 is a destination of distribution (e.g. a box) of the clock signal; and 30 indicates signal paths (e.g. a cable) connecting section 10 and destination 20. Further, 40 is a lower rank destination of distribution (e.g. wiring board) disposed in a destination of distribution 20, and 50 is a still lower rank destination of distribution 40 (e.g. LSI chip) in which there are disposed still further terminal destinations of distribution (e.g. flipflops). In addition 13, 21 and 41 are buffer circuits for increasing fan out. For example, each buffer circuit may be composed of an LSI chip. This device aims to supply clock signals having a small skew at the terminal destinations of distribution.

Now the working mode of this whole device will be explained briefly.

A high frequency signal generated by an oscillator 11 is divided into 2 signals, one of which is transmitted to the destination of distribution 50 with its frequency unchanged. Hereinbelow, this signal will be called original clock signal. The other of them is divided by a frequency divider 15 up to a frequency, for which manual phase regulation is easy, and transmitted to the destination of distribution 50 after having been regulated with high precision as the phase reference. Hereinbelow this signal will be called the reference signal. For example, in the case where the frequency of the clock signal is 700 MHz, the frequency of the reference signal is preferably 100 to 200 MHz or still lower. In each of the destinations of distribution 50, the original clock signal is corrected in phase by the variable delay circuit 51 and applied to the device 12. The frequency divider 12 generates further clock signals having frequencies and phases necessary for the terminal destinations of distribution. The clock signals having various phases generated by the frequency divider 12 are supplied to a number of terminal destinations of distribution through the signal paths having an identical propagation time, and at the same time they are supplied to the phase comparing circuit 52 as feedback signals. The phase comparing circuit 52 compares the feedback signal with the reference signal and adjusts the delay time of the variable delay circuit 51 so that the phase of the feedback signal is in accordance with that of the reference signal. Next, the construction of the variable delay circuit 51, the phase comparing circuit, etc. will be described in detail.

Figure 3A:
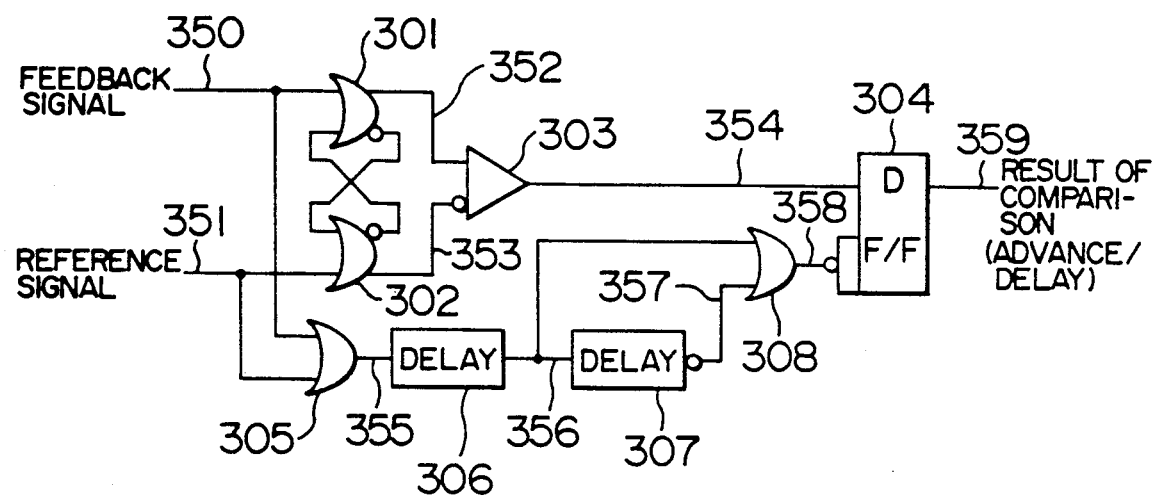
FIGS. 3A and 3B show the construction indicating an embodiment of the phase comparing circuit which is used for realizing the present invention, and waveforms for explaining the working mode thereof, respectively.
Figure 3B:
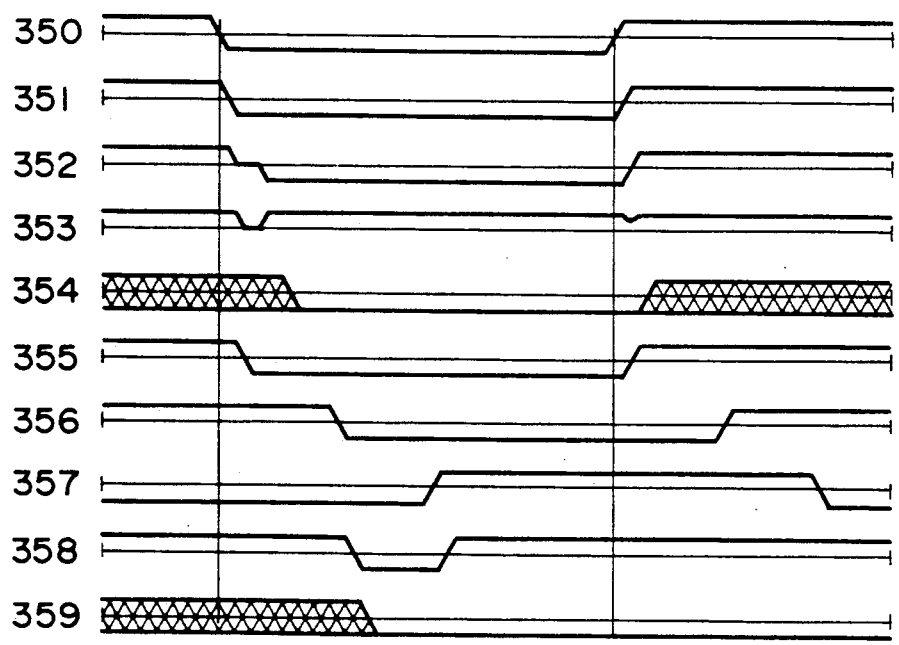

An embodiment of the phase comparing circuit 52 is indicated in FIG. 3A, and an example of waveforms for explaining the working mode thereof are shown in FIG. 3B. In FIG. 3A, 301, 302, 305 and 308 are OR/NOR circuits; 303 is a differential circuit; and 304 is a D-type flipflop. 306 and 307 are delay circuits having a fixed delay time and may be either constructed by connecting several steps of OR/NOR circuits in cascade or realized by using a signal wiring having an appropriate length disposed on wiring board. One of 350 and 351 is a terminal through which the feedback signal is inputted, and the other of is one through which the reference signal is inputted, the phases of these two signals being compared with each other. Now, it is supposed that the phase of the feedback signal inputted through the terminal 350 is slightly advanced with respect to the phase of the reference signal inputted through the terminal 351, as indicated in FIG. 3B. Then, both the voltages at the terminals 352 and 353 are at the high level while both the signals inputted through the terminals 350 and 351 are at the high level, but since the fall of the signal inputted through the terminal 350 begins slightly earlier than the fall of the signal inputted through the terminal 351, the voltage at the terminal 352 begins to decrease slightly earlier than the voltage at the terminal 353. At this time, since the circuits 301 and 302 are cross-connected at the output on the NOR side the voltage, which has begun to decrease slightly later (i.e. voltage at the terminal 353), returns again to the high level in a course. As the result, after a certain time measured from falling edges of the signals inputted through the terminals 350 and 351, it is determined that the voltage at the terminal 352 is at the low level and the voltage at the terminal 353 is at the high level, and the voltage at the output terminal 354 of the differential circuit 303 is at the low level. Further, in the case where the relationship in the time between the signals inputted through the terminals 350 and 351 is inverted, the voltage at the terminal 354 is at the high level. Consequently, if the voltage level at the terminal 354 is received in a latch 304 after the certain time measured from the falling edges of the signals inputted through the terminals 350 and 351, the voltage level at the output terminal 359 is determined, responding to the relationship in the time between the signals inputted through the terminals 350 and 351. Thereafter, the voltage level at the terminal 359 remains unchanged, until the relationship in time between the signals inputted through the terminals 350 and 351 is reversed. Further, the timing of receiving the voltage level at the terminal 354 in the latch 304 can be arbitrarily set, as indicated in FIG. 3B, depending on the signal propagation time in the circuits 305, 306, 307 and 308.

Figure 4:
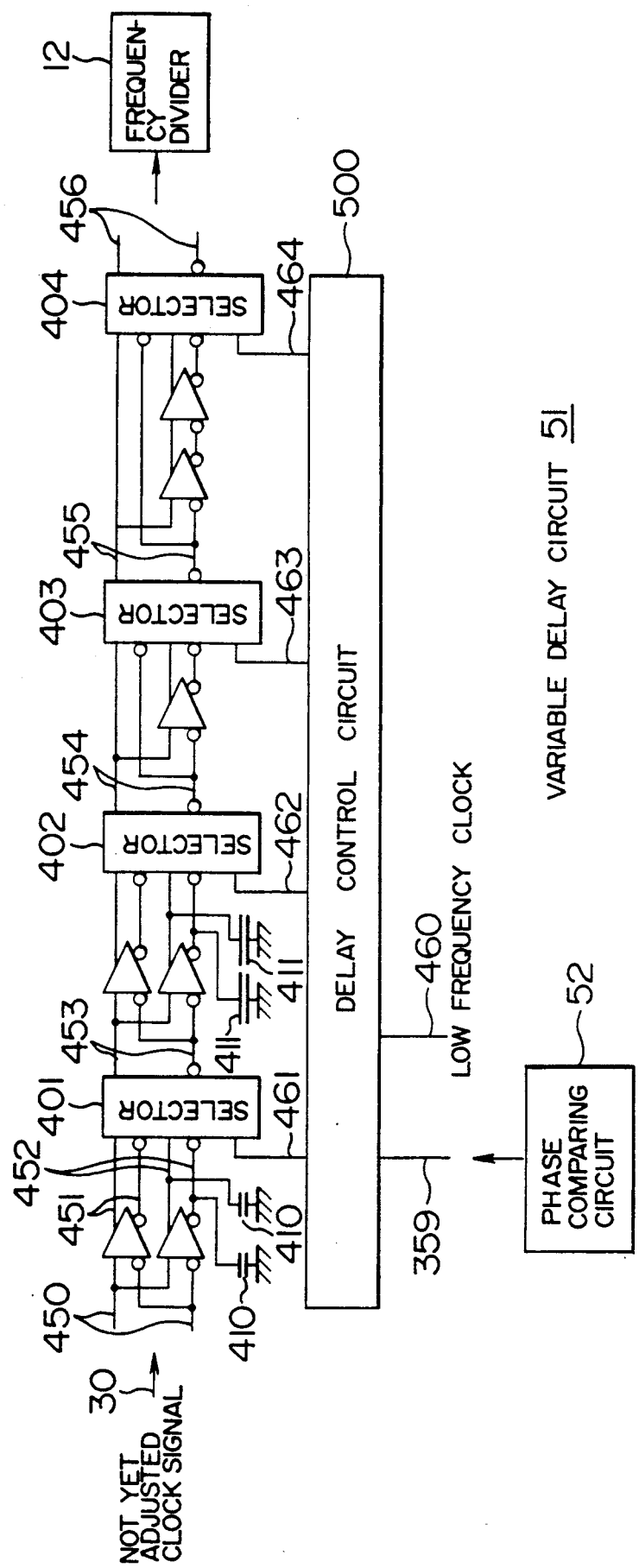
FIG. 4 is a scheme illustrating the construction of an embodiment of the variable delay circuit which is used for realizing the present invention.

Now an embodiment of the variable delay circuit 51 is indicated in FIG. 4. In FIG. 4, reference numeral 450 is a terminal through which the clock signal not yet adjusted passes from the signal path 30, 456 is a terminal through which the adjusted clock signal obtained by delaying the not yet adjusted clock signal by an arbitrary time is outputted, and is a terminal through which a signal is inputted for controlling the delay time, the judgement result (feedback signal) of the phase comparing circuit 52 being used therefor directly or through a noise filter as described later. Further, 460 is a terminal through which the clock signal is inputted for varying the control signal for the delay control circuit 500 and a clock signal having a period which is equal to or longer than that of the reference signal, i.e. relatively slow, which has a frequency of, e.g., 4 kHz, is supplied therefor. This low frequency clock signal is supplied by a service processor described later or obtained by frequency-dividing the reference signal. 461 to 464 are control signal terminals for switching over the output of selectors 401 to 404, respectively. That is, the signal outputted to the terminal 453 through the selector 401 is, e.g., the signal inputted through the terminal 451 when the voltage at the terminal 461 is at the low level, and the signal inputted through the terminal 452 when the voltage at the terminal 461 is at the high level. Since the signals inputted through the input terminals 451 and 452 in the selector 401 are signals obtained by delaying the original clock signal inputted through the terminal 450 by the signal propagation time corresponding to 1 step of the differential circuit and a signal obtained by delaying it further by the increase in the signal propagation time due to the load capacitance 410, respectively, it is possible to vary the signal delay time from the terminal 450 to the terminal 453 by an amount corresponding to the increase by switching over the control signal at the terminal 461. In the same way, it is possible to vary the signal delay time from the terminal 453 to the terminal 454 by switching over the control signal at the terminal 462. In this case, if the circuit is so designed that a load capacity is greater than the load capacitor 410, the variation in the delay time by the switching-over of the control signal at the terminal 426 can be greater than the variation in the delay time by the switching-over of the control signal at the terminal 461. In this way, it is possible to realize the variable delay circuit 51 capable of varying the delay time of the not yet adjusted clock signal by using a digital control signal. The central value of the whole delay in the variable delay circuit 51 is selected so that the reference signal and the delayed clock signal are in accordance with the phase at the central value. That is, for an amount of delay smaller than that at the central value, the phase of the clock signal is advanced, and for an amount of delay greater than that at the central value, the phase of the clock signal is retarded (with respect to the reference signal). Further, since the waveform of the signal becomes dull if the load capacity is too great, when it is desired to increase the variation in the delay time, it is preferable to form a difference in the delay time by a difference in the number of stages of the circuit in the input of the selector 403 or 404 rather than by increasing the load capacity. Furthermore, when a very great difference in the delay time is required, it is also possible to gain the difference in the delay time by the amount of delay in a cable by making the signal on the side where it is to be delayed pass on the wiring board or through the cable. In this way, so long as the number of bits for the control signal is not limited, it is possible to realize a variable delay circuit 51 having an arbitrary minimum resolving power and an arbitrary maximum variable width.

For example, if the circuit is so designed that, in FIG. 4, the load delay due to the capacitive element 410 is 30 ps; the load delay due to the capacitive element 411 is 50 ps; and the gate delay is 100 ps per stage of gate, the maximum variable width is 380 ps ($=30+50+100\times1+100\times2$) at the minimum resolving power 30 ps. On the contrary, when it is desired to realize a variable delay circuit having a minimum resolving power of $\alpha$ and the maximum variable width of A, denoting the variable width of each of stages of $a_1$, $a_2$, $a_3$, ..., $a_n$, the capacitive elements and the number of stages may be so designed that the following relations are satisfied;

$$a_1 < \alpha$$
$$a_2 - a_1 < \alpha$$
$$a_3 - (a_2 + a_1) < \alpha$$
$$a_4 - (a_3 + a_2 + a_1) < \alpha$$
$$\vdots$$
$$a_n - (a_{n-1} + \ldots + a_3 + a_2 + a_1) < \alpha$$
$$a_n + a_{n-1} + \ldots + a_3 + a_2 + a_1 > A$$

Figure 5:
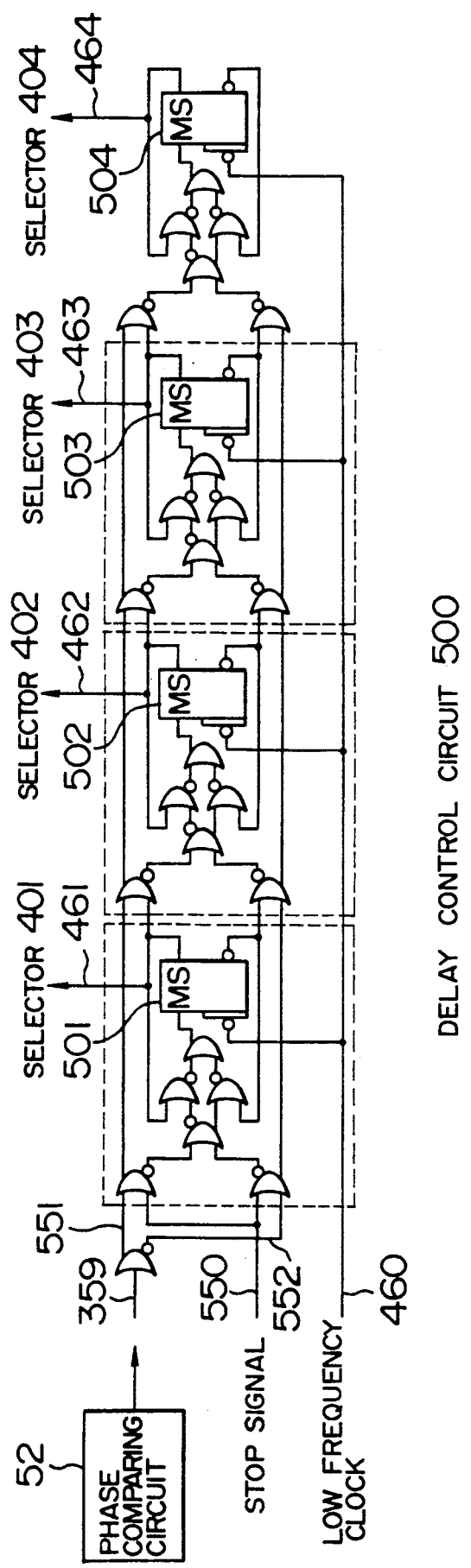
FIG. 5 is a scheme illustrating the construction of an embodiment of the delay controlling circuit which is used for realizing the present invention.

The delay control circuit 500 can be realized, e.g., by using UP/DOWN counters, an embodiment of which is indicated in FIG. 5. In FIG. 5, 501 to 504 are master-slave type flipflops; 359 is a terminal through which the result of judgement of the phase comparing circuit 52 is inputted; and 460 is a terminal through which a relatively slowly varying clock signal is inputted. The frequency of the clock signal applied to this terminal 460 will be explained in detail in the explanation on FIG. 7. 461 to 464 are terminals for outputting control signals for switching over the selector in the variable delay circuit. The binary numerical values represented by the levels at the terminals 461 to 464 vary so as to increase by 1 count for every pulse of the clock signal inputted through the terminal 460 when the voltage at the terminal 359 is at the high level, and to decrease by 1 count for every pulse thereof when the voltage at the terminal 359 is at the low level. Consequently, in the case where the phase of the feedback signal is advanced with respect to the phase of the reference signal, the voltage at the terminal 359 is set at the high level so that the delay time in the variable delay circuit 51 is increased, and on the contrary, in the case where the phase of the feedback signal is retarded, the control is effected so that the delay time is decreased. In this way, it is possible to adjust the phase of the feedback signal so that it is in accordance with the phase of the reference signal.

The signal inputted through the terminal 550 is destined to stop the control after the termination of the phase regulation to fix the voltage level at the terminals 461 to 464. Since almost none of the circuits is driven in an AC-like manner before the start of the supply of the clock signal, noises generated within the electronic computer are at most as great as the ripple in the power supply. On the contrary, as soon as the clock signal is supplied, a number of circuits are driven all at once, which gives rise to an increase in noise occurrences. Consequently, at first the phase regulating mechanism is driven in a state where no clock signal is supplied to the terminal destinations of distribution, but only the feedback signal is outputted. After the termination of the phase regulation, the voltage at the terminal 550 is changed to the high level to stop the control signals at the terminals 461 to 464 to be varied, and the supply of the clock signal is begun thereafter. In this way, the phase regulation can be effected without being subjected to significant influences of the noises, and thus it is possible to reduce the clock skew. Further, the detection of the termination of the phase regulation can be realized by waiting for a sufficiently long time necessary so that the numerical value represented by the output of the delay circuit is varied from the minimum to the maximum, e.g., by means of a timer circuit, etc. The service processor explained later takes charge of the function of the timer circuit.

Figure 6:
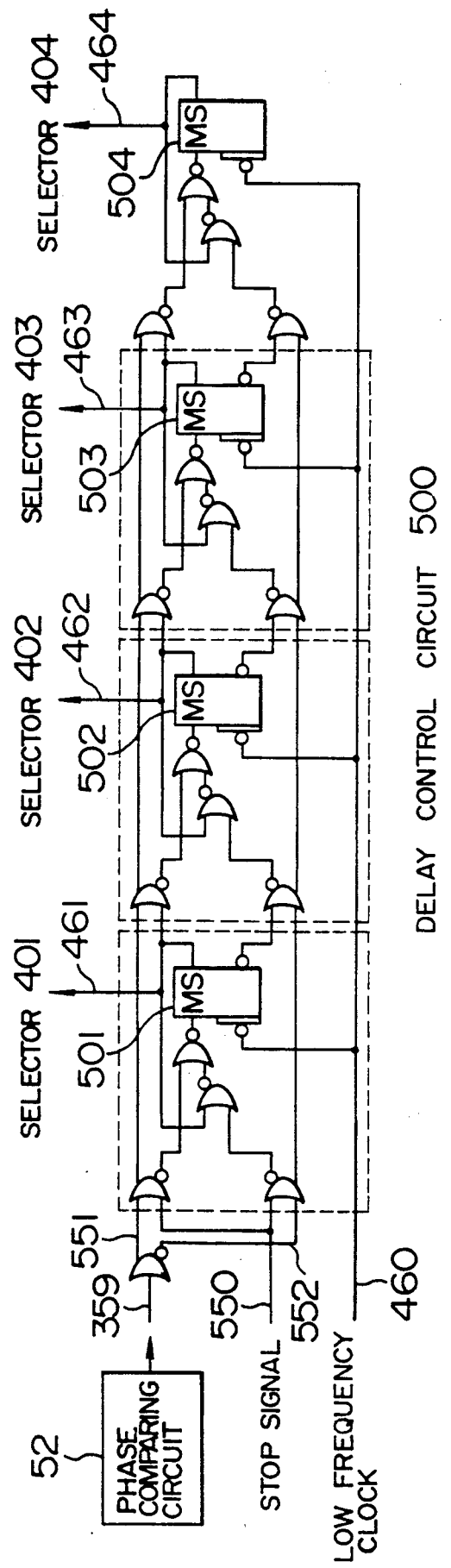
FIG. 6 is a scheme illustrating the construction of another embodiment of the delay controlling circuit which is used for realizing the present invention.

FIG. 6 is a scheme illustrating the construction of another embodiment of the delay control circuit 500. Contrary to the fact that the circuit indicated in FIG. 5 is composed of usual UP/DOWN counters, in the circuit indicated in FIG. 6, only one among the bits 461 to 464 (concretely speaking, the closest to the terminal 359 among the bits, which can vary, responding to the instruction inputted therethrough) is varied by one pulse inputted through the terminal 460. This circuit shortens the time necessary up to the termination of the phase regulation by increasing variations in the delay time as long as the phase shift is great just after the start of the phase regulation. N representing the numbers of bits of the control signal, contrarily to the fact that the time necessary up to the termination of the phase regulation is $2^N$ times as long as the period of the clock signal inputted through the terminal 460 for the circuit indicated in FIG. 5, for the circuit indicated in FIG. 6 the former is only N times as long as the latter. Consequently, when N is great, that difference is particularly remarkable. On the other hand, the circuit indicated in FIG. 6 is not suitable for the control of bits having a small width of the delay time to be switched over with respect to the circuit indicated in FIG. 5. Consequently, when the number of bits for the variable delay circuit is great, it is preferable that less significant bits are controlled by the delay control circuit indicated in FIG. 5, and more significant bits are controlled by the delay control circuit indicated in FIG. 6. When it is desired to increase or decrease the number of bits of the control signal, the number of the parts enclosed by the broken lines in the figures is increased or decreased for both the circuits indicated in FIGS. 5 and 6. Further, in the case where the less significant bits are controlled by the circuit indicated in FIG. 5 and the more significant bits are controlled by that indicated in FIG. 6, the parts enclosed by the broken lines in each of the figures are divided into two at some point and the part which is on the left side therefrom in FIG. 5 is connected with the part which is on the right side therefrom.

Figure 7:
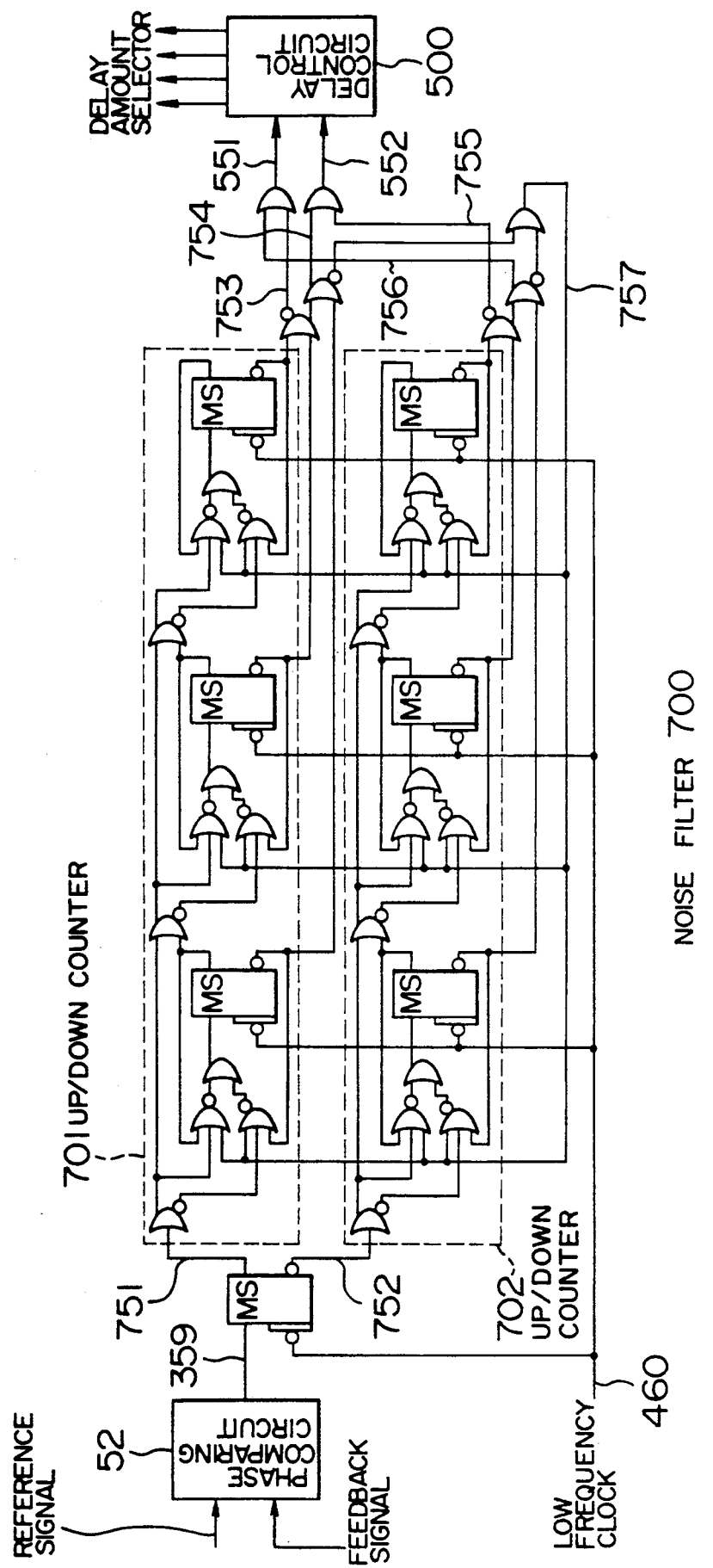
FIG. 7 is a scheme illustrating the construction of an embodiment of the noise eliminating circuit which is used for realizing the present invention.

FIG. 7 shows an embodiment of the noise filter connected between the phase comparing circuit 52 and the delay control circuit 500. In FIG. 7, each of the parts indicated by 701 and 702 constitutes a counter circuit. Reference numeral 359 is a terminal with which the output 359 of the phase comparing circuit 52 is connected, and 551 and 552 are terminals which are connected with the terminals 551 and 552, respectively, in FIGS. 5 and 6. 460 is a terminal through which the reference signal or a slowly varying clock signal having a further longer period is supplied, just as in FIGS. 5 and 6.

The supply of this clock signal may be effected either by using the reference signal in common or from the service processor. Further, a separate oscillator may be disposed therefor.

In the circuit indicated in FIG. 7, when the voltage at the terminal 359 is at the high level, the terminal 751 is at the high level and the terminal 752 is at the low level so that the count proceeds only in the counter 702 and so that the output of the counter 701 remains unchanged. On the contrary, when the voltage at the terminal 359 is at the low level, the count proceeds only in the counter 701 and the output of the counter 702 remains unchanged. Further, as long as the count number of the counters 701 and 702 is small, the voltages at the terminals 754 and 756 are at the high level and the voltages at the terminals 551 and 552 are at the high level. However, when the counter 701 or 702 arrives at a certain count number (e.g., 6 in the circuit in FIG. 7), the voltage at the terminal 753 or 755 is at the high level, and when it arrives at the maximum count number (e.g., 7 in the circuit in FIG. 7), the voltage at the terminal 754 or 756 is at the low level. Consequently, before both the counters arrive at the maximum values, the voltages at the terminals 551 and 552 are at the high level. When either one of the counters has arrived at the maximum count number and at the same time as long as the other has not yet arrived at the certain count number, one of the terminals is at the low level. Then, when either one of the counters has arrived at the maximum count number, the voltage at the terminal is turned to the high level, independently of whether the voltage at the terminal 55 or 552 is turned to the low level. Both the counters are reset by the succeeding clock pulse inputted through the terminal 460 and the voltages at the terminals 551 and 552 are at the high level. The voltage levels at the output terminals 461 to 464 of the delay control circuits 500 in FIGS. 5 and 6 do not vary when both the voltages at 551 and 552 are at the high level, but when the voltage at 551 is at the low level, the numerical value represented by the voltage level at the terminals 461 to 464 varies so as to decrease, and when the voltage at 552 is at the low level, it varies so as to increase. Consequently, if the noise filter indicated in FIG. 7 is used, even if the result of judgment of the phase comparing circuit 52 has suddenly gone out of order because of the occurrence of noise, etc., no erroneous control signal is issued immediately. Waiting for several results of judgement, the control is effected according to more numerous results of judgment. Further, when the difference between the number of results of judgment on the advance side and that on the retard side is small, it is judged that the phases are in accordance with each other and the output of the delay control circuit remains unchanged.

For example, the judgment is effected for every period of time of T (i.e., T being the period of the relatively slowly varying clock signal applied to the terminal 400) and the circuit is so contructed that the control is effected waiting for the issue of n results of judgment. That is, (n being the maximum count number of the counters 701 and 702,) it is supposed that the circuit is constructed so that if the difference between the numbers of the results of judgment is smaller than m, the output of the delay control circuit remains unchanged (that is, when the count number arrives at n−m, the voltage at the terminal 753 or 755 is turned to the high level). Then, so that the control is effected, a difference greater than m is necessary between the numbers of the results of judgment, and when the phases are in accordance with each other even if noises whose period is shorter than m×T enter no erroneous control is effected. Consequently, it is possible to reduce influences of noises whose periods are longer than T and shorter than m×T. Further, for a phase difference for which an erroneous judgment can take place due to noises by only one judgment, even if the phase difference is m/n time as small, the control can be effected correctly because a difference greater than m is produced between the numbers of the results of judgment if the judgment is repeated n times. Consequently, if the noise filter is so designed, it is possible to reduce influences of noises whose periods are longer than T and shorter than m×T, to about m/n.

Further, since it is necessary to effect the control, waiting for a time corresponding to the period of the noises for the purpose of removing the influence of the noises, when the period of the noises is very long, the period of the clock signal inputted through the terminal 460 may be made slower or the number of bits of the counters 701 and 702 may be increased.

FIG. 8 is a scheme illustrating the construction of another embodiment of the clock signal supplying device according to the present invention. In the embodiment indicated in FIG. 2, the clock signal and the reference signal are given to the buffer circuit 21 through the signal lines 30 and 31, respectively, and distributed there to the modules 40. On the contrary, in the embodiment indicated in FIG. 8, the buffer circuit 21 is not utilized, but the clock signal and the reference signal are supplied directly to the modules through the signal lines 30 and 31, respectively. In this embodiment, although the number of the cables 30, 31 increases with respect to that indicated in FIG. 2, since there are no fluctuations in the delay time in the buffer circuit 21, the phase precision is improved correspondingly with respect to that obtained by the circuit indicated in FIG. 2. The clock signal source 10 and the lower rank destinations of distribution 40 in FIG. 8 are identical to those indicated in FIG. 2. Also, in the embodiments indicated in FIGS. 10 and 11, the signal distribution method as shown in FIG. 8 can be applied.

Furthermore, the mini-computer for control in FIG. 8 is also called the service processor, which effects the control such as resetting or writing initial values in latches and memories in the main portion mounted on the wiring board after switch-on of the power source, etc. However, it is possible also to utilize this mini-computer to supply the signal for fixing the output of the delay control circuit indicated in FIG. 5 or 6 at the point of time, where the phase regulation by means of the device according to the present invention is terminated o for switching over the frequency divider indicated in FIG. 9A. At this time, whether the phase regulation is terminated or not can be known by the time which has lapsed after the start of the phase regulation. That is, the period with which the noise filter indicated in FIG. 7 outputs the control signal to the terminal 551 or 552 is the time obtained by multiplying the period (e.g. 100 $\mu$s) of the low frequency clock signal inputted through the terminal 460 by the count number (8 in the case of FIG. 7) counted up to the point of time where the counter incorporated in the noise filter makes one turn. The number of the bits being represented by N (4 in the example in FIG. 5), when the delay control circuit indicated in FIG. 5 receives at least $2^N$ control signals (16 in the example in FIG. 5), it arrives at the final state thereof and the phase regulation is terminated. In the above example, this time is 100 $\mu$s×8×16≈13 ms. Further, although a 4-bit structure is indicated for the variable delay circuit in FIG. 4 and for the delay control circuit in FIG. 5, in practice a structure of about 6 to 12 bits is the most suitable. Even in this case the phase regulation is terminated in several seconds after the start.

Further, in order to fix the output of the delay control circuit indicated in FIG. 5 or 6, it is sufficient to turn the voltage at the terminal 550 to the high level. When it is at the high level, the same levels as the signals appearing at the outputs 461, 462, 463 and 464 of the latching circuits 501, 502 503 and 504 are applied always to the inputs thereof, respectively, so that the levels of the outputs are fixed.

It is a matter of course that the service processor in FIG. 8 can be used as well in the embodiment indicated in FIG. 2.

Figure 9A:
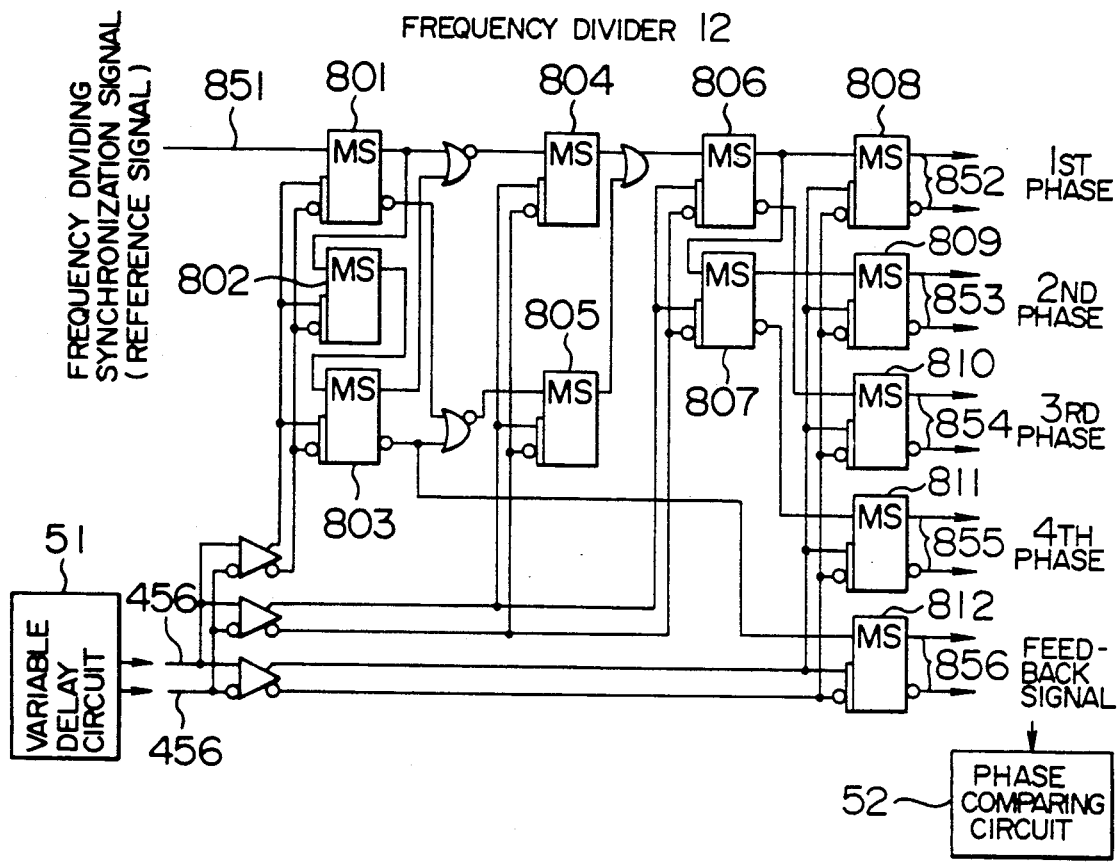
FIGS. 9A and 9B show the construction indicating an embodiment of the frequency dividing circuit which is used for realizing the present invention, and waveforms for explaining the working mode thereof, respectively.
Figure 9B:
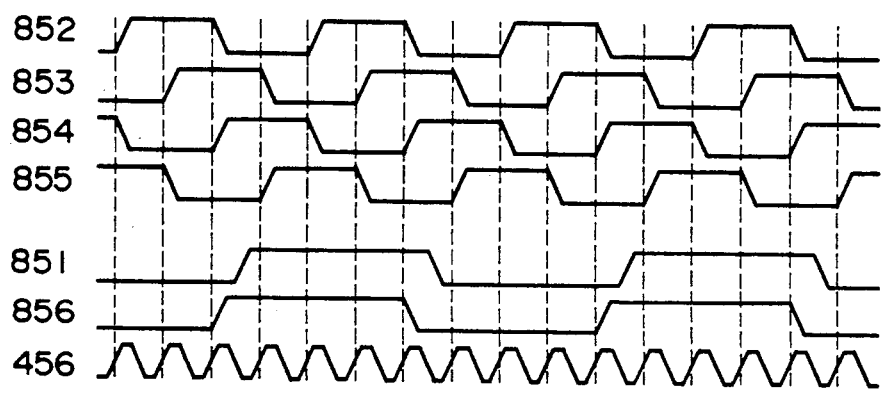

FIG. 9A is a circuit diagram indicating an embodiment of the frequency divider 12 in FIG. 2. However, in this embodiment, the clock signal necessary for the terminal destinations of distribution is a clock signal having 4 phases, which are shifted by ¼ period to each other, as indicated by 852 to 855 in FIG. 9B (in FIG. 9B only the phase on the positive pole side are indicated). At this time, the period necessary for the not yet adjusted clock signal is equal to the amount of the shift in the 4-phase clock signal, i.e., ¼ of the period of the 4-phase clock signal. This not yet adjusted clock signal is inputted in the variable delay circuit 51, the output of which is inputted through the terminal 456 in FIG. 9A. Then, the signal is applied to the master-slave type flipflops 801 to 812 with a same phase. Further, 851 indicates a terminal through which the signal for synchronizing the beginning of the frequency division is inputted and with which a terminal outputting a same signal as the reference signal used for the phase comparison is connected. However dummy loads, etc. are added as needed so that the input load is as symmetric as possible on the reference signal side and on the feedback signal side. Further, although in the embodiment indicated in FIG. 9A it is supposed that the period of the reference signal is 8 times as long as the period of the not yet adjusted clock signal (consequently 2 times as long as the period of the clock signal necessary for the terminal destinations of distribution), when the former is a number other than 8 times as long as the latter, the shift register composed of the flipflops 801 to 803 is set by varying the number of stages thereof so that the signal applied to the terminal 851 and the signal outputted through the terminal 856 satisfy the phase relation described below. The signal applied to the terminal 851 is outputted to the terminal 856 through the shift register composed of the flipflops 801, 802, 803 and 812 as the feedback signal to the phase comparing circuit 52. At this time the phase is one obtained by retarding the signal applied to the terminal 851 by a period of time which is slightly shorter than one period thereof and consequently, one obtained by advancing slightly the signal applied to the terminal 851, as indicated in FIG. 9B. Then, the signal is inputted from the terminal 856 through the buffer circuit, etc. in the phase comparing circuit 52 as the feedback signal, where the phase thereof is compared with the phase of the reference signal (i.e., same as the signal applied to the terminal 851) and the variable delay circuit 51 is controlled so that the phases of these two signals are in accordance with each other. On the other hand, the outputs of the flipflops 801 and 803 are applied to the flipflops 808 to 811 through NOR circuits flipflops 804 to 807, etc. and in this way the clock signals having the desired phase relation, as indicated in FIG. 9B, are outputted through the terminals 852 to 855. At this time, since it is secured that the flipflops 808 to 811 are driven with the same clock as the flipflop 812 and that when the delay time in the buffer circuit is added to the phase of the signal outputted through the flipflop 812, the result thus obtained is in accordance with the phase of the reference signal, when the terminals 852 to 855 are connected with the terminal destinations of distribution through buffer circuits whose delay time is equal to that of that buffer circuit, the phase at the terminal destinations of distribution is secured. Further, since the fluctuations in the delay time among the circuit within one LSI chip are remarkably smaller than the fluctuations in the delay time among the circuits in different LSI chips, if the flipflops 808 to 812 and the buffer circuits described above are disposed within a same LSI chips, it is possible to reduce the clock skew at the terminal destinations of distribution. Further, the circuit indicated in FIG. 9A can work without flipflops 804 and 805. However, in this case since a delay time corresponding to two stages of gates is necessary from the flipflops 801 and 803 to the flipflops 806 and 807, the highest working frequency is lowered. Consequently, in the case where it is desired to drive the circuit with a high speed, it is desirable to connect with a delay time shorter than the time corresponding to one stage of the gate flipflops with other flipflops by disposing the flipflops 804 and 805.

Figure 10:
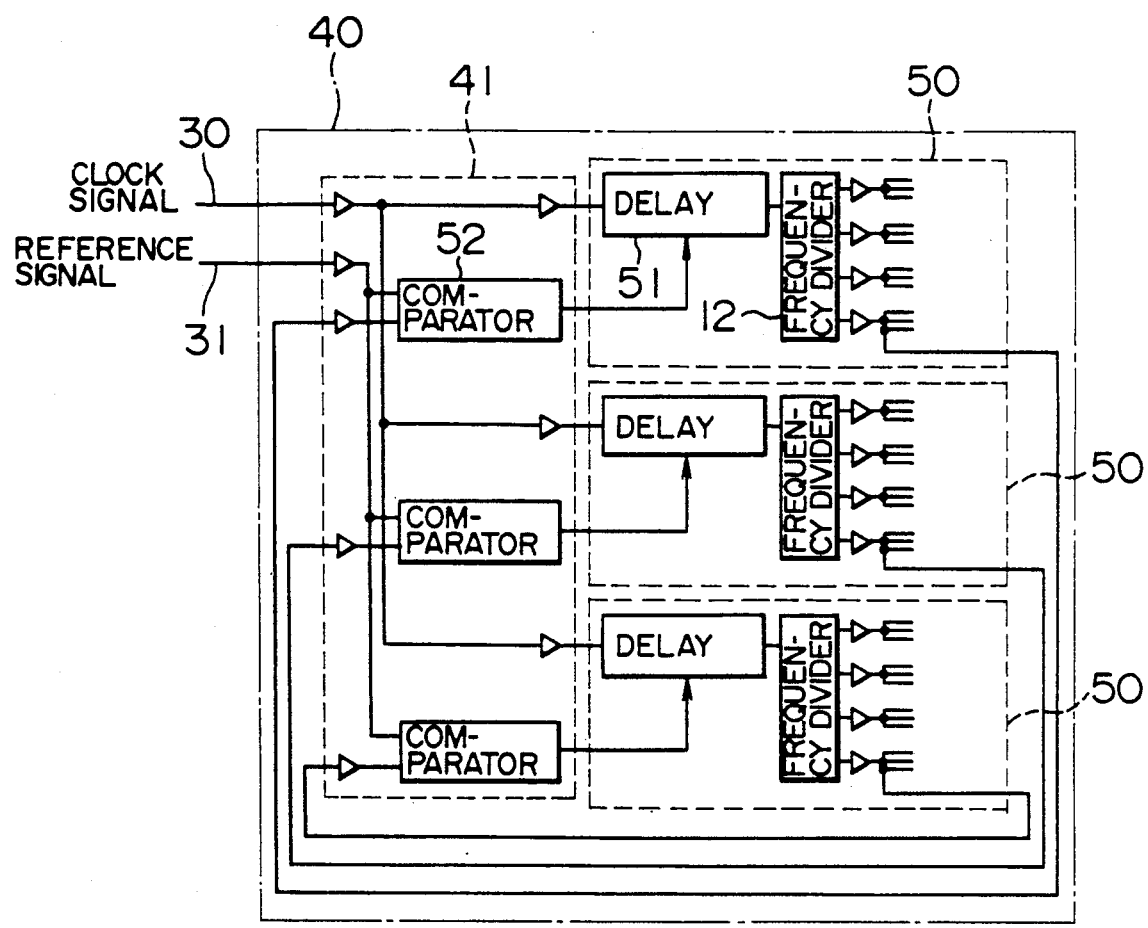
FIG. 10 is a scheme illustrating a part of the construction of still another embodiment of the present invention.
Figure 11:
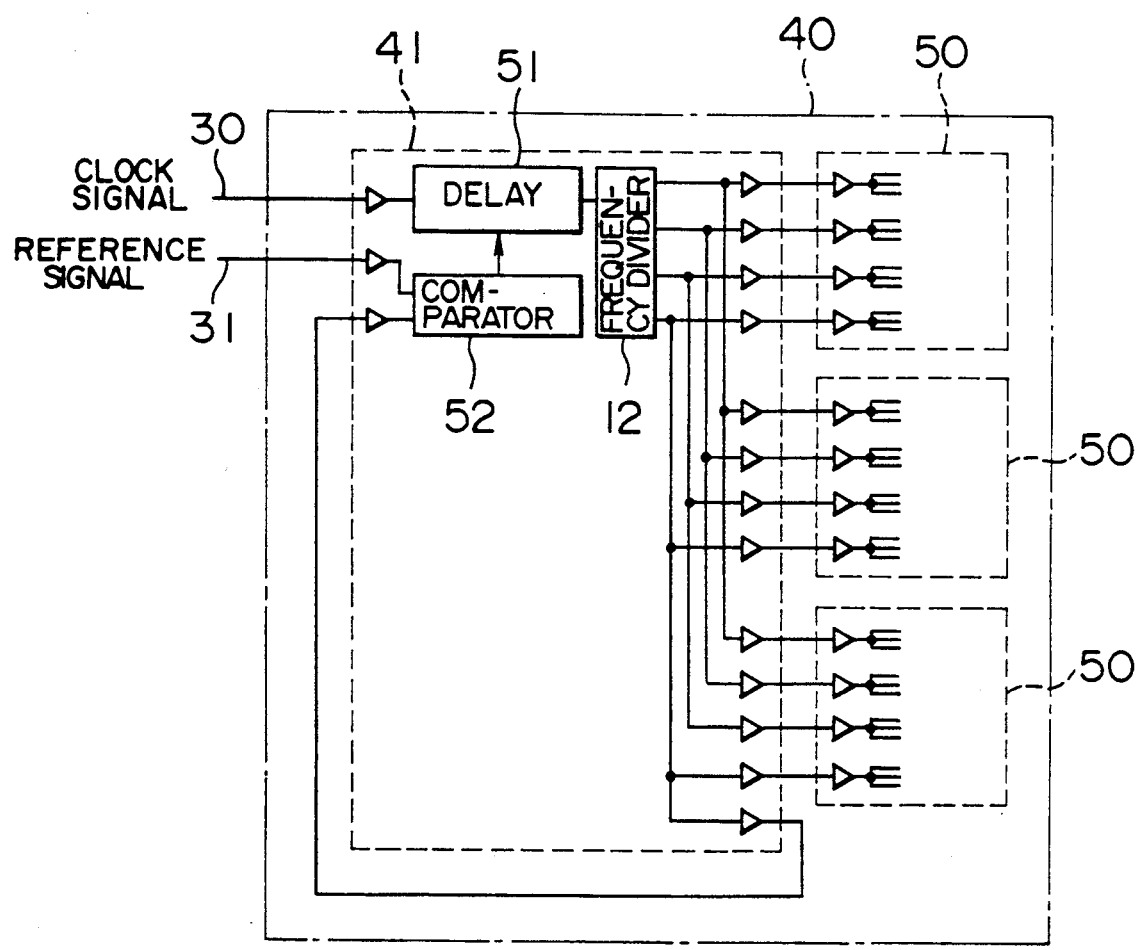
FIG. 11 is a scheme illustrating a part of the construction of still another embodiment of the present invention.

Further, in order to bring out effectively the effect of this invention, at least the reference signal should be transmitted with a phase adjusted as precisely as possible. For this purpose there can be cases where it is more advantageous to reduce the number of lines, through which the reference signal passes, either by disposing a number of only of the phase comparing circuits 52 within a same LSI chip 41, as indicated in FIG. 10, or by dividing the parts belonging to the phase regulating mechanism and parts belonging to the logic circuit including the terminal destinations of distribution into different LSI chips, as indicated in FIG. 11. FIGS. 10 and 11 show different embodiments for the parts of the low rank destinations of distribution 40 in the embodiment indicated in FIG. 2.

Contrary to the fact that in the embodiment indicated in FIG. 2, similar to the not yet adjusted clock signals, the reference signal is supplied also to the still lower destinations of distribution 50 through the buffer LSI chip 41 in the embodiment indicated in FIG. 10, and a number of phase comparing circuits which is equal to the LSI chip 50, which are the destinations of distribution, are prepared in the buffer LSI chip 50 so that the phase comparison is effected there. Since the signal path from the buffer LSI chip 41 to the LSI chip, which includes the lower rank destinations of distribution, passes outside of the LSI chips, the delay time is long and the fluctuations therein are great. On the contrary, within one LSI chip, since the delay time is short, the fluctuations therein are also small. Consequently, according to the embodiment indicated in FIG. 10 it is possible to reduce the skew in the reference signal. Even by using the structure indicated in FIG. 10, it is necessary to supply the signal for synchronizing the beginning of the frequency division by means of the frequency divider 19 (the signal applied to the terminal 851 in FIG. 9A).

The embodiment indicated in FIG. 11 is a simplified version of the embodiment indicated in FIG. 10 in which the variable delay circuit 51 and the frequency divider 12 are formed also within the buffer LSI chip 41. In this embodiment, it is not possible to regulate separately the fluctuations in the delay time in different LSI chips constituting each of the destinations of distribution 50, but it is possible to reduce necessary materials such as the number of signal lines on the module 40 which make the feedback signals pass through the variable delay circuit 51, the phase comparing circuit 52, the frequency divider 12, etc. Furthermore, in the embodiment indicated in FIG. 11, it is possible also to make the feedback signal wiring pass within the buffer LSI chip 41. However, in this case, it is difficult to adjust the delay time in the signal path passing through the buffer LSI chip and connecting still lower rank destinations of distribution 50 so as to be in accordance with the delay time in the signal path for the feedback signal. Still further, in the embodiment indicated in FIG. 11, in the case where the number of output pins of the buffer LSI chip 41 is insufficient, there should be disposed 2 buffer LSI chips 41 on the module 40. However, also in this case, it is unnecessary to increase the number of the reference signal lines by disposing 2 phase comparing circuits 52 on either one of the buffer LSI chips. Further, although in the embodiment indicated in FIG. 2, the buffer LSI chip 21 is disposed in the signal path transmitting the reference signal from the clock signal generating section 10 in FIG. 2 to the lower rank destinations of distribution 40 indicated in FIG. 2, 10 or 11, if there is left a margin in the fan out number of the clock signal generating section 10 and the mounting space for the cable 30, it is a matter of course that the skew can be further reduced by directly connecting each of the lower rank destinations of distribution 40 with the clock signal generating section 10 by means of the cable 30.

Now, when the feedback signal passes outside of the LSI chip, as shown in the embodiments indicated in FIGS. 10 and 11, the delay time from the output of the feedback of the frequency divider 12 (i.e. the terminal 856 in FIG. 9A) to the input of the phase comparing circuit 52 is long. Then, by the work of the automatic phase regulating mechanism, the signals other than 851 indicated in FIG. 9B are shifted to the left correspondingly, and the timing by which the flipflop 801 receives the signal inputted through the terminal 851 is advanced correspondingly thereto. At this time, when the amount of the shift becomes as great as the period of the signal inputted through the terminal 456, it becomes impossible to receive the signal inputted through the terminal 851 at a desired peak of the signal inputted through the terminal 456, and therefore the outputs through the terminals 852 to 855 and 856 are retarded by one period of the signal inputted through the terminal 456. Hereinbelow, this is called "phase shift". When a phase shift is produced, the phase, which is going at length to be in accordance, is shifted by one period of the signal inputted through the terminal 456, which makes the phase regulation impossible. In order to prevent this, a shifter circuit, as indicated, e.g., in FIG. 12, as an example, may be used.

Figure 12:
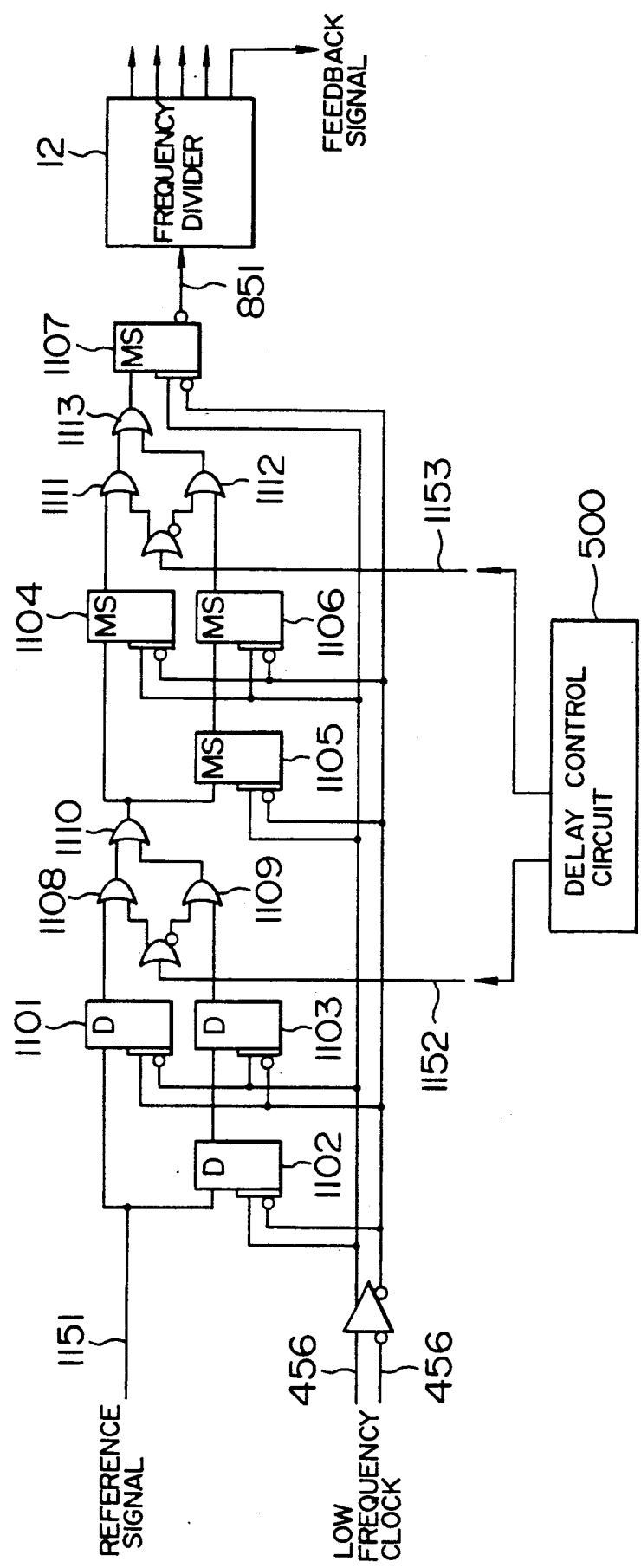
FIG. 12 is a scheme illustrating the construction of an embodiment of the shifter circuit which is used for realizing this invention.

The circuit indicated in FIG. 12 is connected before the frequency divider circuit indicated in FIG. 9A, in which the same signal as the reference signal is inputted through a terminal 1151, and a terminal 851 is connected with the terminal 851 in FIG. 9A. Through a terminal 456 the same signal as that inputted through the terminal 456 in FIG. 9A is inputted. Signals inputted through terminals 1152 and 1153 are the most significant 2 bits of the output obtained by adding two parts corresponding to the two bits to the delay control circuit 500 indicated in FIG. 6. In this way, when both the voltage levels at the terminals 1152 and 1153 are high, the signal inputted through the terminal 1151 is outputted to the terminal 851 through the D type flipflops 1102 and 1103 as well as the master-slave type flipflops 1105, 1106 and 1107. Consequently, in this case, a signal obtained by retarding the signal inputted through the terminal 1151 by ¼ period of the signal inputted through the terminal 456 and further by inverting it, i.e. a signal, which is nearly equal to that inputted through the terminal 1151 is outputted through the terminal 851 and the circuit indicated in FIG. 8 works in the same way as described previously. However, when the phase shift described above takes place, the output of the delay control circuit continues to be varied so as to decrease the delay time in the variable delay circuit 51, and after the delay time in the variable delay circuit 51 has arrived at the smallest, the voltage level at the terminal 1152 becomes low. Then, the signal inputted through the terminal 1151 is outputted through the flipflop 1101. Therefore, the signal which could not be received at the desired peak by the flipflop 1102 is received by the flipflop 1101 working with the antiphase clock after a half period, which eliminates the phase shift. Further, in the case where the signal still cannot be received, the signal inputted through the terminal 1153 is at the low level and the signal outputted through the terminal 851 is shifted forward by one period of the signal inputted through the terminal 456. The outputted signal acts so as to remove the phase shift in this way. Furthermore, in the case where it can still take place that the signal cannot be received, the circuit may be constructed so that one stage of the part for changing over the number of stages of flipflops is added thereto.

Figure 13:
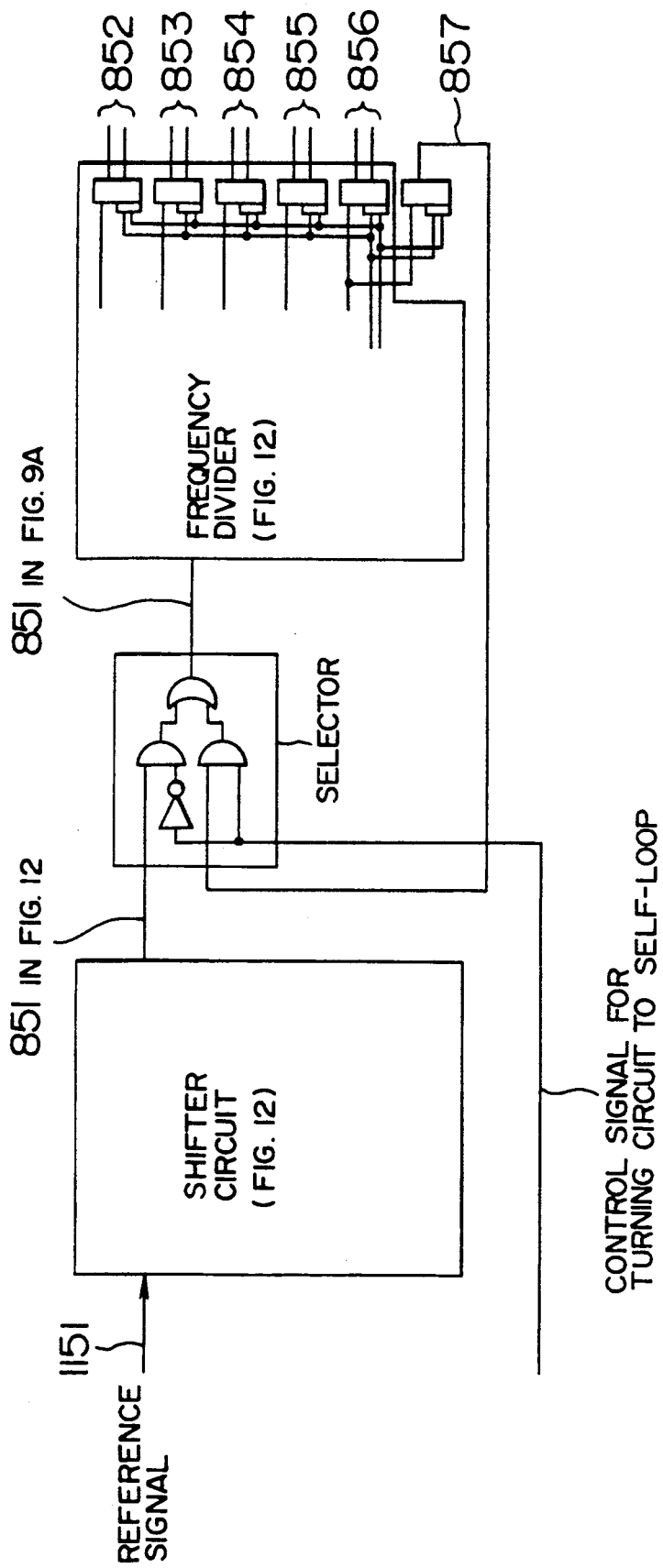
FIG. 13 is a scheme illustrating the construction of a circuit switching over the synchronizing signal of the frequency divider.

FIG. 13 illustrates a embodiment of the control circuit for connecting the shifter circuit indicated in FIG. 12 with the divider indicated in FIG. 9A, or turning the circuit to a self-loop. A self-loop means a circuit construction in which the feedback signal to the frequency divider 12 is used as a synchronizing signal for the frequency divider 12. When the control signal for turning the circuit to the self-loop is at the low level, the selector connects the output 851 of the shifter circuit indicated in FIG. 12 with the frequency divider 12 indicated in FIG. 9A. On the contrary, when it is at the high level, the selector connects the signal appearing at the terminal 857 therewith so that the frequency divider indicated in FIG. 9A constitutes the selfloop. The signal appearing at the terminal 857 is the same as the signal appearing at the plus pole of the terminal 856. However, in order to make the loads connected with the terminals 852 to 856 uniform, it is desirable to separate the terminals 856 and 857 from each other and to dispose latch circuits separately therefor, as indicated in FIG. 13.

As it is clear from the above description, when the mini-computer for control in FIG. 8 begins the phase regulation, it is sufficient for the mini-computer to put the signal at the terminal 550 in FIG. 5 or 6 and the control signal for turning the circuit to the self-loop in FIG. 13 at the low level, and to put the two signals at the high level after a predetermined period of time. Consequently, it is possible also to use a timer in lieu of this mini-computer for control. Further, in the case where the phase regulation is effected just after the switch-on of the power source, the time until the temperature of LSI, etc. is stabilized can be longer than the time necessary for the phase regulation. In this case, it is preferable to wait for the longer time.

Further, also for the shifter circuit indicated in FIG. 12, if flipflops are added between the OR circuits 1108, 1109 and the OR circuit 1110 and between the OR circuits 1111, 1112 and the OR circuit 1113 just as the flipflops 804 and 805 in the frequency dividing circuit indicated in FIG. 9A, it is possible to shorten the signal propagation time from a flipflop to another to increase the speed.

Further, in the case where the supply of the clock signal to the terminal destinations of distribution is stopped at the phase regulation and the supply is begun after the output of the delay control circuit is fixed after the termination of the phase regulation, the phase shift takes place more easily after the supply to the terminal destinations of distribution has been started. In order to avoid this, the supply to the terminal destinations of distribution may be started after having switched over the signal inputted through the terminal 851 in FIG. 9A to the signal outputted through the terminal 856 after having fixed the output of the delay control circuit 500.

Figure 14A:
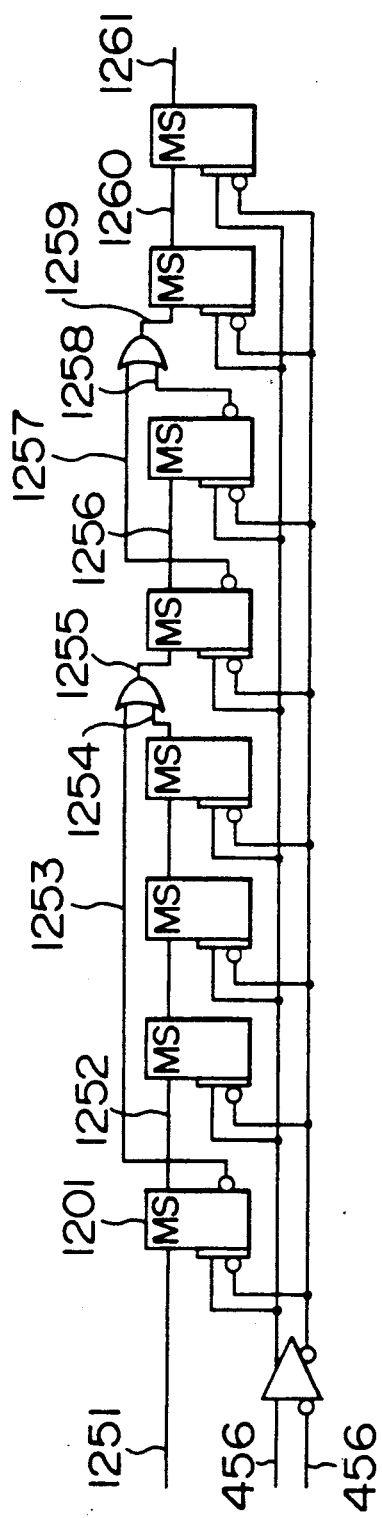
FIGS. 14A and 14B show the construction indicating an embodiment of the wave-shaping circuit for improving further the present invention, and waveforms for explaining the working mode thereof, respectively.
Figure 14B:
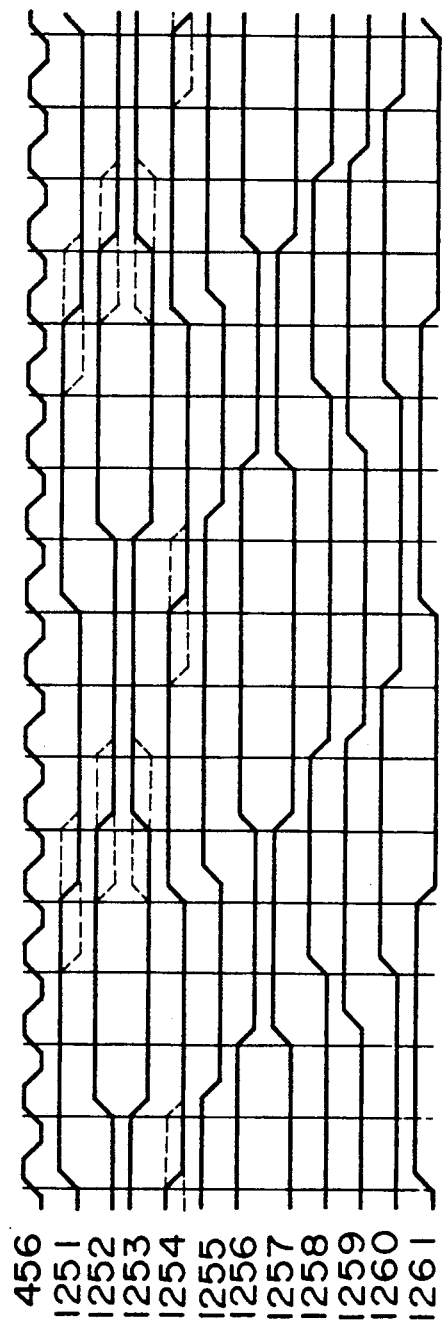

Further, although the frequency divider indicated in FIG. 9A is constructed so as to work by using both the rising edge and the following edge of the synchronizing signal inputted through the terminal 851, according to circumstances, it can take place that the phase shift is produced only at an edge and that the signal is received normally at the other edge. In this case, only one of the edges of the synchronizing signal may be used to reproduce the other edge. An embodiment of the circuit therefor is shown in FIG. 14A. This circuit is inserted between the shifter circuit in FIG. 12 and the frequency dividing circuit in FIG. 9A. The signal outputted through the terminal 851 in FIG. 12 is connected with the input terminal 1251 and the signal outputted through the terminal 1261 is connected with the terminal 851 in FIG. 9A. The same signal as that at the terminal 456 of the frequency dividing circuit in FIG. 9A or the shifter circuit in FIG. 12 is connected with the terminal 456. The operation of this wave-shaping circuit is as follows. As indicated in FIG. 14B, by using only the rising edge of the signal 1251, the two edges, i.e., both the rising edge and the falling edge, are produced by forming a logic sum signal 1255 of a signal 1253 obtained by receiving and inverting the signal inputted through the terminal 1251 by means of a flipflop and a 3-stage shifted signal 1254. The pulse width is returned to the original value thereof by forming a logic sum signal 1259 of a signal 1257 obtained by shifting that signal further by one stage and inverting it and a signal obtained by shifting that signal by two stages and inverting it. That is, the rising edge of the signal 1253 is at a point of time where the signal 1254 is at the high level and the following edge of the signal 1254 is at a point of time where the signal 1253 is at the high level. For this reason, the falling edge and the rising edge of the logic sum signal 1255 are determined by the falling edge of the signal 1253 and the rising edge of the signal 1254, respectively. On the other hand, both the falling edge of the signal 1253 and the rising edge of the signal 1254 are obtained by shifting the rising edge of the signal 1251. Consequently, both the falling edge and the rising edge of the signal 1255 are obtained by shifting the rising edge of the signal 1251. Consequently, as long as the rising edge of the signal 1251 produces no phase shift, even if a phase shift takes place for the falling edge of the signal 1251, as indicated in FIG. 14B, the phase shift has no influences on the signals after the terminal 1255.

FIG. 15A illustrates an example of the arrangement of LSIs within a lower rank destination of distribution (e.g. wiring board), the electric connection of which is indicated in FIG. 11. Reference numeral 41 indicates an LSI chip for the clock distribution provided with a phase regulating mechanism according to the present invention and 50 a logic LSI chip for constructing the logic for the principal part. FIG. 15A shows a case where there is only one LSI chip for the clock distribution, in which the clock signal and the reference signal supplied through the cable 30 are received by a connector disposed near the LSI chip 41 for the clock distribution. Starting from these two signals, the LSI chip 41 for the clock distribution generates various sorts of clock signals, as indicated in FIG. 9B, and supplies them to general LSI chips within the wiring board 40. Now, depending on the kind of the logic mounted on the wiring board 40, there can be a case where a great number of clock signals are required and it is conceivable that output pins are insufficient by one LSI chip 41 for the clock distribution. In such a case, it is necessary to mount in total 2 LSI chips on the wiring board, adding another LSI chip 42 for the clock distribution thereto, as indicated in FIG. 15B. At this time, it is a problem how the reference signal is supplied to the added LSI chip 42 for the clock distribution. That is, just as for FIG. 15A, when the signal received through the connector is supplied to both the LSI chips 41 and 42, since the load condition varies, the phases of the reference signal for the case indicated in FIG. 15A and the case indicated in FIG. 15B are not in accordance with each other. Further, if cables 30 are disposed separately for the chips 41 and 42, not only the number of cables increases but also this gives rise to a remarkable restriction on the design that the load condition is always same for all the wirings from the connector to the LSI chips 41 and 42, including the case indicated in FIG. 15A.

Figure 16:
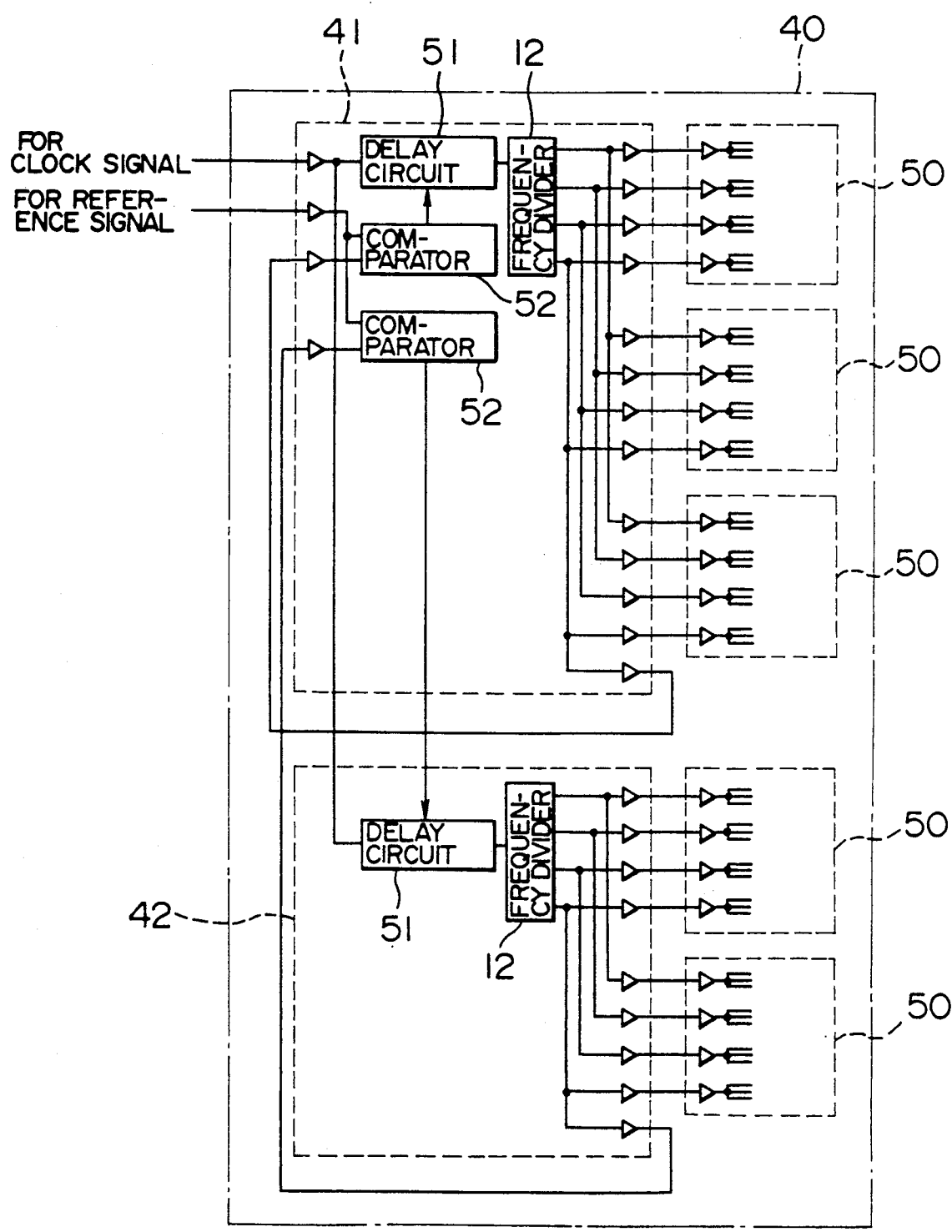
FIG. 16 is a scheme illustrating the construction of still another embodiment of the present invention.

This problem can be solved by disposing 2 sets of phase comparing circuits 52 in one LSI chip 41 for the clock distribution, as indicated in FIG. 16. All the signals necessary for the other LSI chip 42 for the clock distribution are supplied relayed from the LSI chip 42. The comparison of the phase of the output with the phase of the reference signal is effected within the LSI chip 41 and the result of the judgment is supplied to the LSI chip 42. In this way, it is not necessary to provide a new cable for the LSI chip 42. Thus, the wiring from the connector to the LSI chip 41 can be designed in common for the case indicated in FIG. 15A and the case indicated in FIG. 15B. Further, in this case, in order to make the load conditions uniform for the LSI chip 41 for the clock distribution within FIG. 11 and the LSI chip 41 for the clock distribution within FIG. 16, there may be disposed 2 sets of phase comparing circuits 52 also in the LSI chip 41 for the clock distribution in FIG. 11, only one of which is used.

Figure 17:
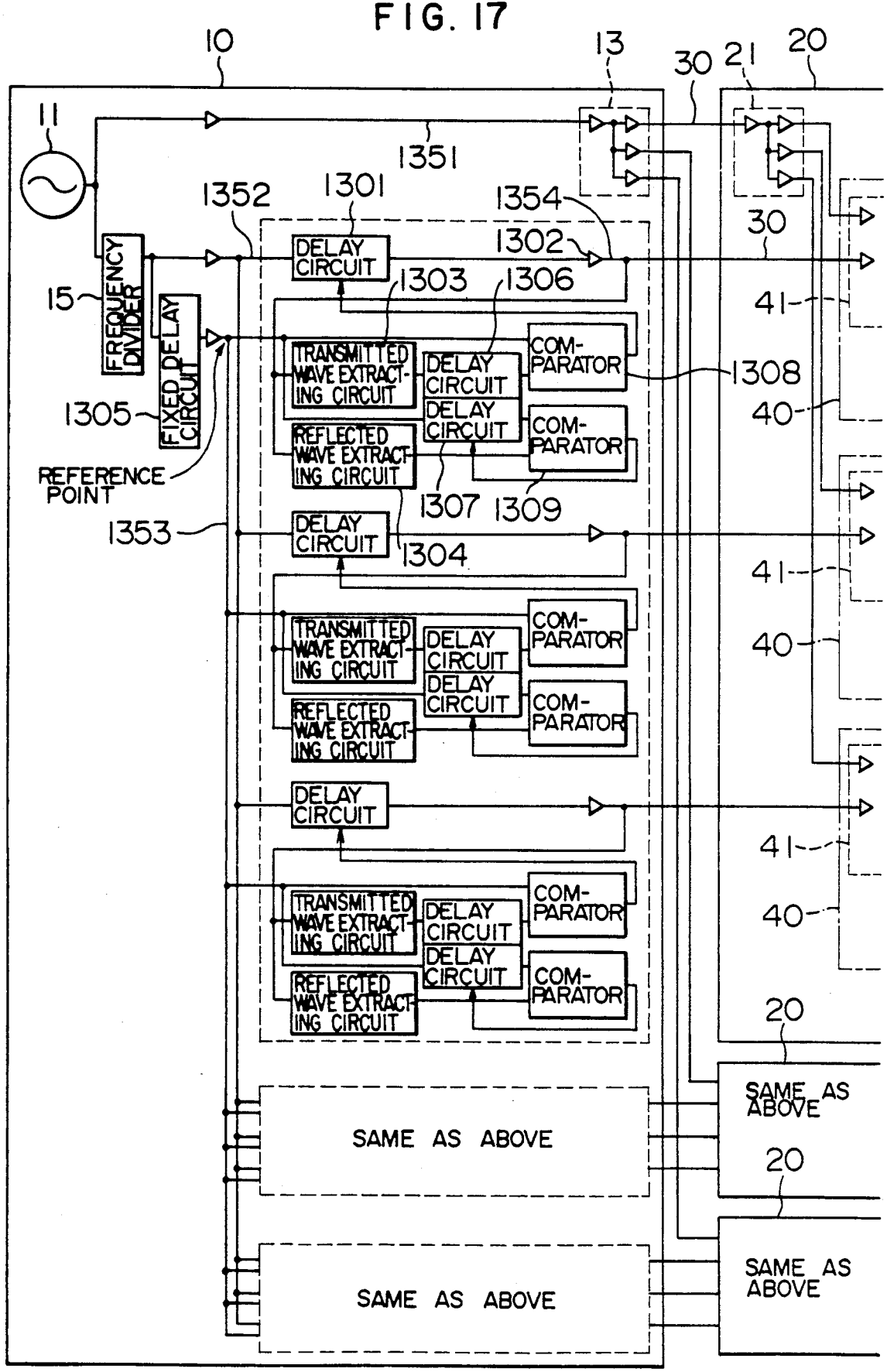
FIG. 17 is a scheme illustrating the construction of still another embodiment of the present invention.

FIG. 17 shows another embodiment for adjusting not only the phase of the clock signal but also the phase of the reference signal with a high precision. Similar to FIG. 2, reference numeral 10 is a clock signal generating section; 20 is a higher rank destination of distribution; 30 is a signal path connecting them; and 15 is a frequency divider for generating the frequency of the reference signal. Further, 40 indicates the same as the lower rank destination of distribution 40 indicated in FIG. 2, 10 or 11. However, for the terminal receiving the reference signal, there is no matching ending for producing the reflection by intension. Further, this embodiment shows an example in which for the reference signal the clock signal generating section 10 is connected directly with the lower rank destination of distribution 40 without interposing any buffer circuit 21. In addition, the phase reference in this embodiment is a signal at the terminal 1353 obtained by delaying the output of the frequency divider 15 by a predetermined time by means of a fixed delay circuit 1305. A feature of an embodiment indicated in FIG. 17 is that the point of time where the signal transmitted from the clock signal generating section 10 to the destination of distribution 40 (hereinbelow called transmitted wave) passes through an output point 1354, and the point of time where the signal which has arrived once at the destination of distribution 40 and reflected there to return (hereinbelow called reflected wave), passed again through the original output point 1354, can be detected. The point of time obtained by averaging these two points of time represents the point of time where the signal arrives at the destination of distribution 40. Consequently, the variable delay circuit 1301 is controlled so that that point of time is in accordance with the point of time, where the signal at the terminal 1353 serving as the phase reference arrives at the destination of distribution 40. In this way, the phase of the reference signal can be made uniform for all the destinations of distribution. Hereinbelow, the principal part of the embodiment indicated in FIG. 17 will be explained referring to FIGS. 18A and 18B.

Figure 18A:
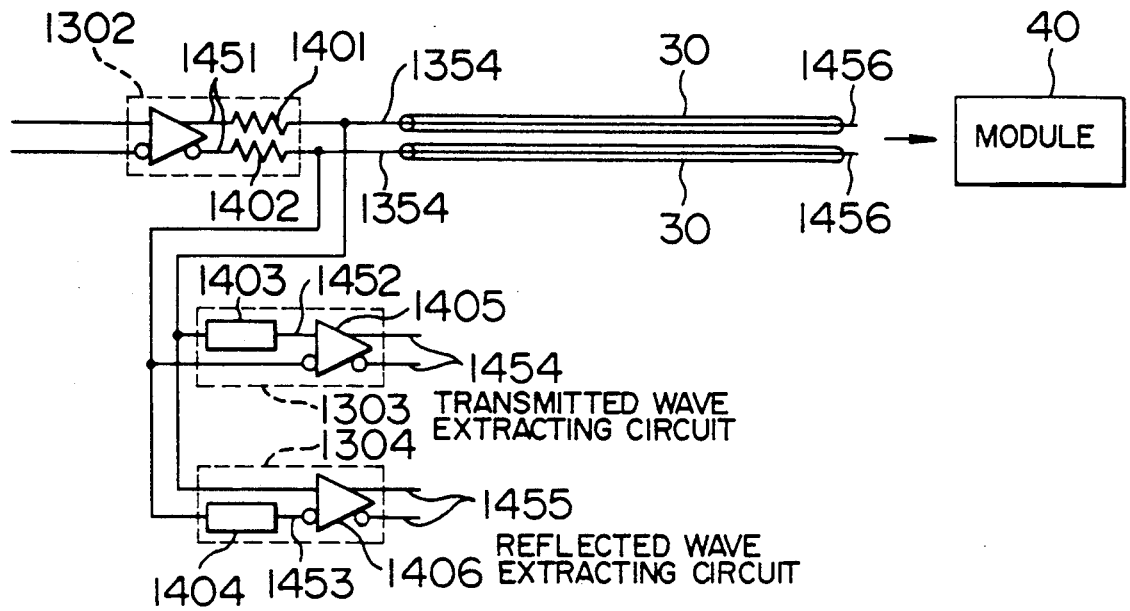
FIGS. 18A and 18B show the construction of a part of the embodiment indicated in FIG. 17, and waveforms for explaining the working mode thereof.
Figure 18B:
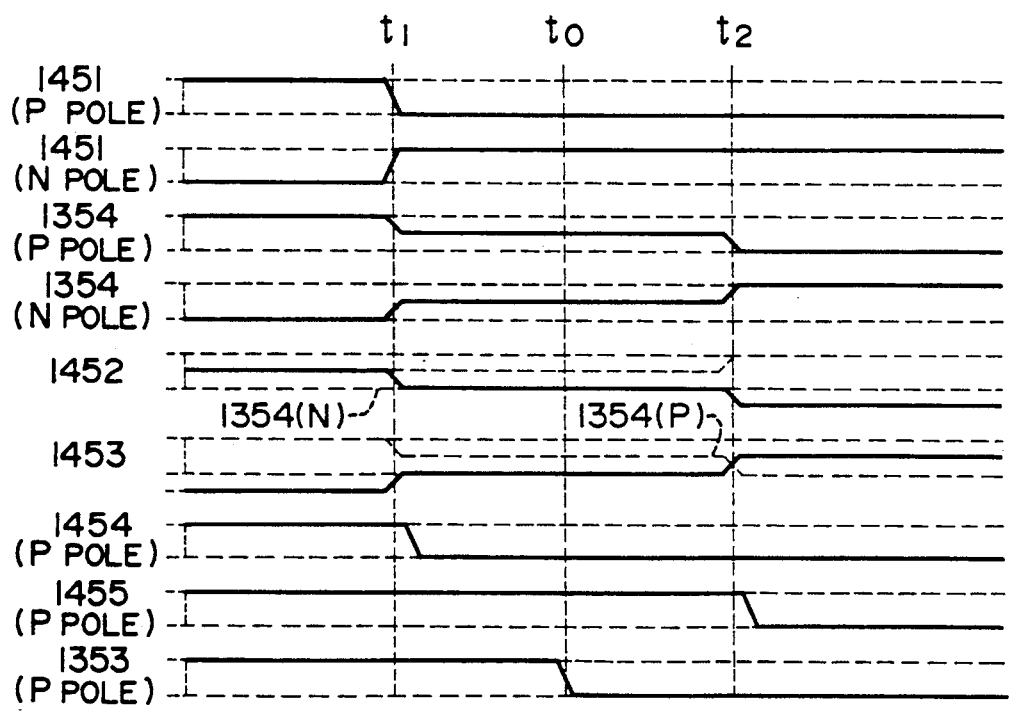

FIG. 18A is a scheme illustrating the construction of an embodiment of transmitted wave and reflected wave extracting means, in which reference numeral 1302 is an output buffer circuit; 1303 is a transmitted wave extracting circuit; and 1304 is a reflected wave extracting circuit. In the output buffer circuit 1302, resistors 1401 and 1402 are destined to make the output impedance of the differential circuit be matched with the characteristic impedance of the signal path 30. The transmitted wave extracting circuit 1303 and the reflected wave extracting circuit 1304 are constituted by level shift circuits 1403 and 1404 and differential circuits 1405 and 1406, respectively. It is supposed that, as indicated in FIG. 18B, at a point of time $t_1$, a falling signal is inputted on the P pole side of the terminal 1451 and a rising signal on the N pole side thereof. Then a level variation having an amplitude, which is a half of the level variation appearing at the terminal 1451, appears at the terminal 1354 owing to a voltage dividing circuit constituted by the characteristic impedance of the signal path 30, and the resistors 1401 and 1402. The signal is transmitted through the signal path 30 to arrive at the terminal 1456, which is in the destination of distribution. There it is reflected and transmitted again through the signal path 3 to return to the terminal 1354, where it is terminated by the resistors 1401 and 1402. This point of time is $t_2$. After the point of time $t_2$, the voltage level at the terminal 1354 is equal to the voltage level at the terminal 1451, as indicated in FIG. 18B. Here, when the signal on the P pole side of the terminal 1354 is shifted by a half of the full swing amplitude by means of the level shift circuit 1403, the signal at the terminal 1452 is crossed with the signal on the N pole side of the terminal 1354 at the point of time $t_1$. Consequently, when these two signals are inputted in the differential circuit 1405, at the point of time $t_1$, the signal appears at the terminal 1454.

Strictly speaking, it is later that the point of time $t_1$ by a delay time due to the differential circuit 1405, etc. The signal appears at the terminal 1454. The method for correcting this delay time will be described later. Further, similarly thereto, the signal appears at the point of time $t_2$ at the output terminal 1455 of the differential circuit 1406.

Returning again to FIG. 17, a method for the phase correction using the extracted transmitted and the extracted reflected wave will be described. Here the arrival time of the signal at the terminal 1353 serving as the phase reference is represented by $t_0$. The arrival time of the signal obtained by delaying the phase reference signal by mean of the variable delay circuit 1307 is compared with the arrival time of the reflected wave by the phase comparing circuit 1309 and the variable delay circuit 1307 is controlled so that they are in accordance with each other. Then, the delay time in the variable delay circuit 1307 is converged to $(t_2 - t_0)$. The variable delay circuit 1306 has the same construction as the variable delay circuit 1307 and they use the same control signal in common so that the delay time in the variable delay circuit 1306 is in accordance with the delay time in the latter. Then, the phase comparing circuit 1308 compares the signal obtained by delaying the transmitted wave by means of the variable delay circuit 1306 with the phase reference signal and controls the variable delay circuit 1301 so that they are in accordance with each other. Since the arrival point of time of the transmitted wave is $t_1$; the delay time in the variable delay time 1306 is equal to the delay time $(t_2 - t_0)$ in the variable delay circuit 1307; and the point of time of the phase reference is $t_0$, the following equation is valid:

$$t_1 + (t_2 - t_0) = t_0$$

That is, $t_0 = (t_1 + t_2) + 2$. Therefore, the point of time obtained by averaging the arrival time of the transmitted wave and that of the reflected wave, i.e., the point of time where the reference signal arrives at the destination of distribution 40, is in accordance with the point of time of the phase reference. In this way, it is possible to make the arrival point of time of the reference signal uniform for all the destinations of distribution 40. According to the present embodiment, even if an LSI chip or a cable is exchanged for repair, etc., the phase correction can be effected automatically every time.

Further, as described above, the transmitted wave extracting circuit 1303 or the reflected wave extracting circuit 1304 has a delay time corresponding approximately to one stage of the differential circuit. In order to correct this, a dummy circuit which is equivalent thereto in the delay time may be inserted also for the phase reference signal. If for the dummy differential circuit, the transmitted wave extracting circuit and the reflected wave extracting circuit and the reflected wave extracting circuit are constructed within the same LSI chip, it is possible to reduce further the difference in the delay time between different differential circuits. By mounting selector circuits on the input portions and the output portions of the variable delay circuits 1306 and 1307, the phase comparing circuits 1308 and 1309 and the level shift circuits 1403 and 1404 use them in time sharing, and it may be sufficient to dispose either One of them. In particular, since the variable delay circuits 1306 and 1307 have long delay times, it is difficult to make the characteristics of the two circuits be in accordance with each other. On the contrary, if one circuit is used in time sharing, it is clear that the characteristics are necessarily same. Further, in FIG. 18A, when the amounts of the level shift in the level shift circuits 1403 and 1404 are deviated from just a half of the signal amplitude, the points of time, where the input signals in the differential circuits 1405 and 1406 are crossed, are deviated from $t_1$ and $t_2$. However, if the amounts of the level shift in the level shift circuits 1403 and 1404 are equal to each other, the deviations thereof are in a relation so that their directions are opposite to each other and their absolute values are equal to each other. Consequently, if the amounts of the level shift in the level shift circuits 1403 and 1404 are equal to each other, even if the absolute values thereof are more or less different, the average value of $t_1$ and $t_2$ represents always the point of time where the reference signal arrives at the destination of distribution 40. If the level shift circuits 1403 and 1404 are formed within a same LSI chip, it is possible to reduce mutual fluctuations thereof.

Figure 19:
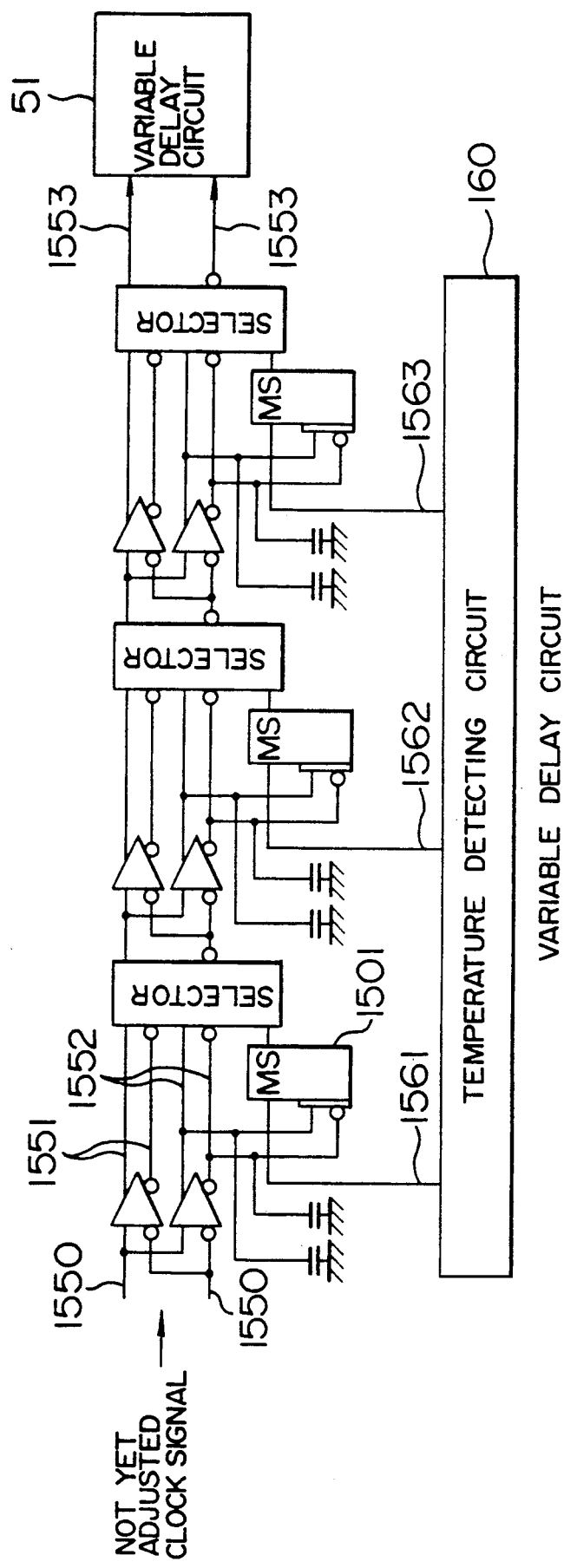
FIG. 19 is a scheme illustrating a part of the construction of still another embodiment of the present invention

However, since the signal delay time in the LSI chip varies depending on the temperature, if the control signal for the variable delay circuit is fixed after the termination of the phase regulation, the phase regulating mechanism does not work for temperature variations thereafter. On the other hand, it is difficult to keep the temperature of the LSI chip always constant in an electronic computer, etc., in which LSI chips producing a large quantity of heat are mounted with high density, and the temperature varies within a region comprised between plus and minus several degrees around a certain temperature, while interrupting the drive of a cooling apparatus by using a temperature sensor. Consequently, the limit of the decrease of the fluctuations in the temperature determines the limit of the decrease of the clock skew. In order to avoid it, it is conceivable to construct the circuit so as to increase the circuit current to raise the load driving power when the temperature rises in order to keep the delay time constant. However, by this construction, when the temperature rises, heat production increases further and therefore there is a risk that thermal reckless driving takes place. Consequently, it is necessary to reduce variations in the delay time due to variations in the temperature while paying attention not to give rise to thermal reckless driving. For this purpose, a variable delay circuit controlled by the temperature may be disposed. FIG. 19 shows an embodiment therefor. This circuit is used when inserted in the path of the original clock signal (e.g. between the terminal for the original clock signal and the input terminal 450 of the variable delay circuit indicated in FIG. 4). Although this circuit is similar to the variable delay circuit 51 indicated in FIG. 4, the former differs from the latter in that there is disposed a flipflop 1501 between the terminal for the control signal 1561 and the selector circuit and that switching over width of the delay time for all the bits is equal to that for the bit having the smallest switching over the width in the circuit indicated in FIG. 4. Since the control signals 1561 to 1563 for this circuit can be switched over, if the temperature varies also after the supply of the clock signal to the terminal destinations of distribution has been started so that the circuit is in a working state, it is necessary to prevent production of hazards due to changes of the control signals. A flipflop 1501 is disposed for this purpose. The circuit is so constructed that just after the voltage level at the terminal 1552 has changed, i.e., when the signals at the terminals 1551 and 1552 are in accordance with each other, the selector is switched over.

Figure 20:
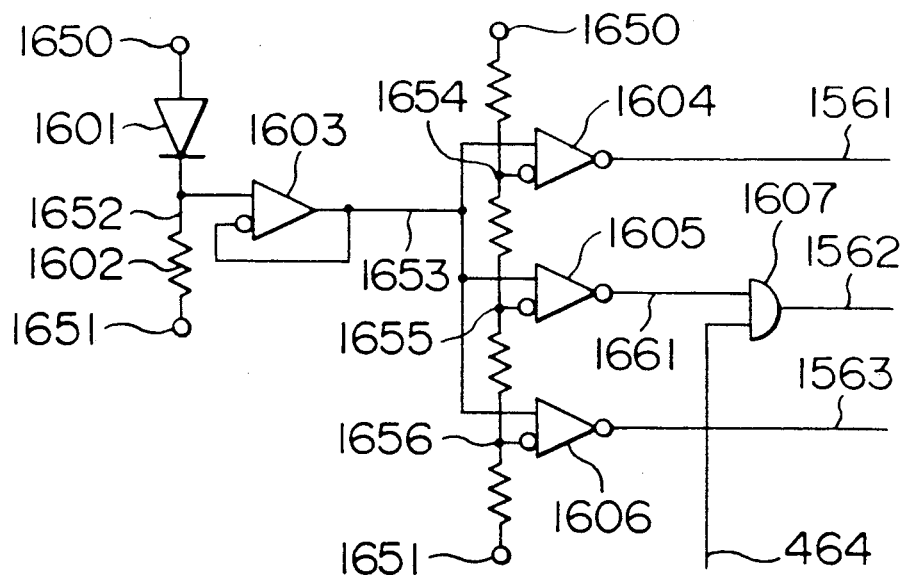
FIG. 20 is a scheme illustrating the construction of an embodiment of the temperature detecting circuit indicated in FIG. 19.

FIG. 20 is a scheme illustrating the construction of an embodiment of the temperature detecting circuit 160. In FIG. 20, reference numerals 1650 and 1651 are power sources; 1561 to 1563 are terminals for the control signals applied to the variable delay circuit; and 464 is a terminal for the control signal applied from the delay control circuit in FIG. 5 or 6. In the circuit indicated in FIG. 20, the part detecting the temperature consists of a diode 1601 and a resistor 1602. When the temperature rises, the voltage drop across the diode 1601 decreases and the voltage at the terminal 1652 increases. Then, that voltage is applied to the inputs on the positive pole side of differential circuits 1604 to 1606 through a buffer consisting of a differential circuit 1603. On the other hand, voltages at terminals 1654 to 1656 obtained by dividing the power source voltage by means of resistors so as to be slightly different from each other are applied to the inputs on the negative pole side of the differential circuits 1604 to 1606. Then, when the temperature is low, all the voltage levels at the terminal levels 1561, 1661 and 1563 are high and the delay time in the variable delay circuit in FIG. 19 is the longest. These pass to the low level in the order of the terminals 1563, 1661 and 1561 with increasing temperature. Consequently, it is possible to compensate the increase in the delay time by the LSI chip and the decrease in the delay time by the variable delay circuit due to variations in the temperature with each other. Further it is for the purpose of varying the sensitivity of the variations in the delay time with respect to the variations in the temperature of the variable delay circuit indicated in FIG. 19, depending on the state of the variable delay circuit indicated in FIG. 4, that an AND circuit is disposed. That is, when the delay time by the variable delay circuit indicated in FIG. 4 is long, since the ratio of variations in the delay time with respect to the variations in the temperature is great, it is necessary to control the variable delay circuit indicated in FIG. 5 with a high sensitivity. Consequently, in this case, the control is effected by using all the three bits. On the contrary, when the delay time by the variable delay circuit indicated in FIG. 4 is short, the ratio of the variations in the delay time with respect to the variations in the temperature is small. In this case, if the control were effected by using all the three bits, it would be overcontrolled. Therefore, in this case, the voltage level at the terminal 1562 is set always at the low level, independently of the temperature, and the control is effected by using the remaining two bits. Further, although in the embodiment indicated in FIG. 20 an example is shown, in which the delay time by the variable delay circuit indicated in FIG. 4 is represented only by the voltage level at the terminal 464, it is a matter of course that influences of the variations in the temperature can be further reduced if a plurality of bits in the control signal of the variable delay circuit indicated in FIG. 4 are used and the circuit is so constructed that the number of taps of the terminals 1654 to 1656 is increased so that they can be compared with a greater number of kinds of voltages.

Figure 1:
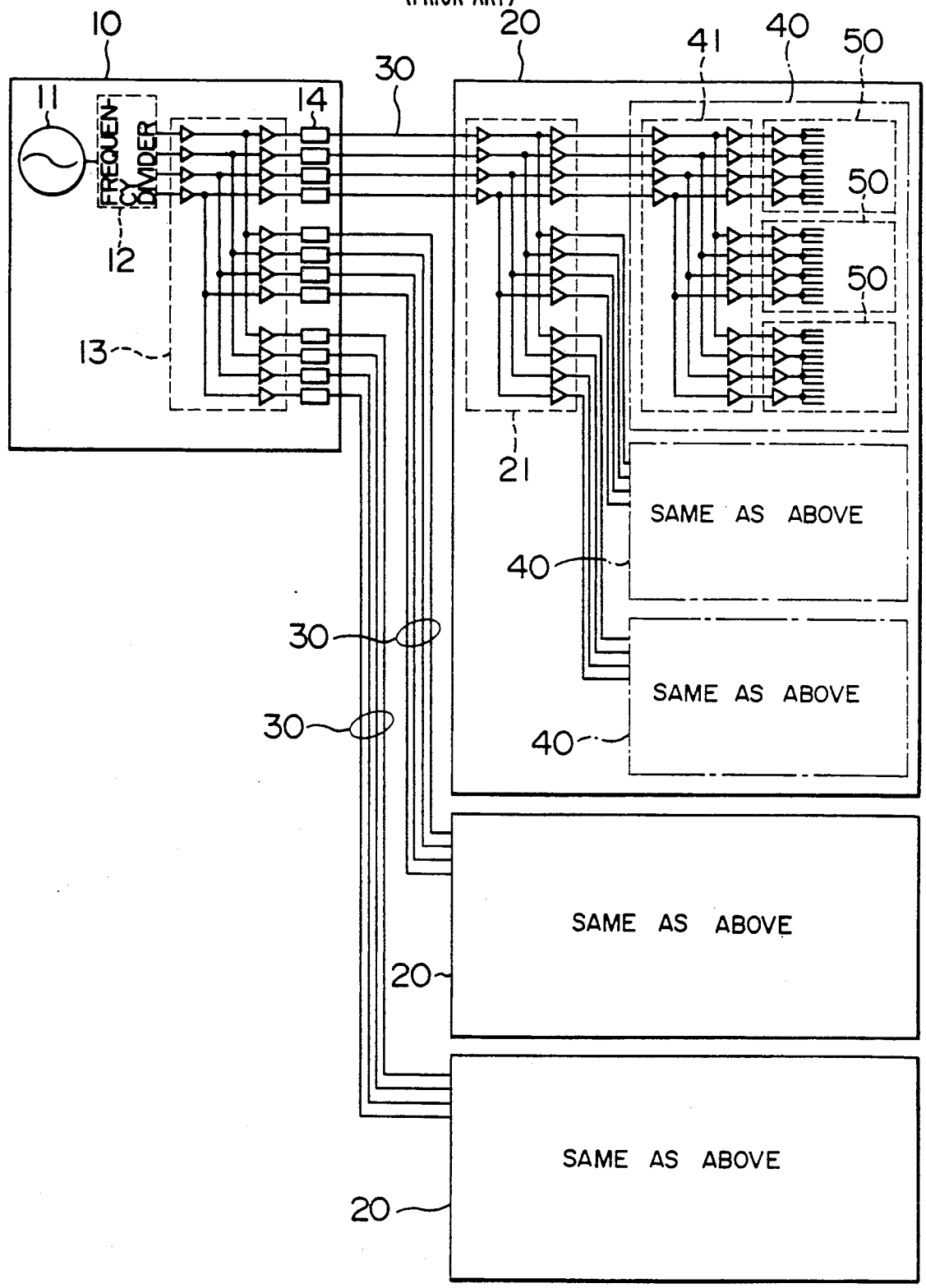
FIG. 1 is a scheme illustrating the construction of a prior art example of the clock signal supplying device.

FIG. 21 is a scheme illustrating the construction of still another embodiment of the present invention. Similar to FIG. 2, etc. reference numeral 10 is a clock signal generating section; 20 is a higher rank destination of distribution; 30 is a signal path connecting them; 40 is a lower rank destination of distribution; and 50 is a still lower rank destination of distribution. In the present embodiment, the frequency divider 12 is disposed on the clock signal generating section 10 side, similar to the prior art example indicated in FIG. 1, and clock signals are transmitted separately to destinations of distribution for every phase. The reference signal in the present embodiment is transmitted while selecting one of the signals obtained by frequency-dividing the clock signals or different phases in time sharing by means of a selector circuit. The phase is readjusted by using the pitch of the oscillation frequency of the oscillator 11 by means of a flipflop 1702. On the destination of distribution 40 side there are disposed a pair of variable delay circuits for every phase, and while comparing the clock signal which has passed through the variable delay circuits with the phase of the reference signal transmitted in time sharing, the variable delay circuit having the phase corresponding to the reference signal transmitted at that time is controlled. According to the present embodiment, the high frequency signal generated by the oscillator 11 is transmitted only up to the frequency divider 12 in the clock signal generating section 10, and the flipflop 1702 and the signals transmitted beyond them have frequencies lower than a half thereof. Consequently, according to the present embodiment, it is possible to increase the oscillation frequency of the oscillator 11 by using an expensive high speed element only for the frequency divider 12 and the flipflop 1702, each of which is only one in the whole system. Further, in the embodiment indicated in FIG. 21 another method is also conceivable, by which signals having frequencies still lower than the clock signals of different phases are transmitted as the reference signals, while adjusting only the phase in time sharing so as to be in accordance with the different phases, and in the destination of distribution 40 signals obtained by frequency-dividing the clock signals which have passed through the variable delay circuits are adjusted in time sharing one after another while comparing them with the reference signals. In this way, it is possible to increase the frequency of the reference signals and to restrict the parts through which high frequency signals pass in an extremely small part of the clock signal generating section. Furthermore, also in the embodiment indicated in FIG. 21, it is possible to dispose variable delay circuits and phase comparing circuits in still lower rank destinations of distribution 50. Still further, in the embodiment indicated in FIG. 21, it is also conceivable to construct the circuit so that fine adjustment is effected by means of a variable delay circuit having a small variable width in a still lower rank destination of distribution, after rough adjustment has been effected by means of a variable delay circuit having a great variable width in a destination of distribution 40.

Figure 22:
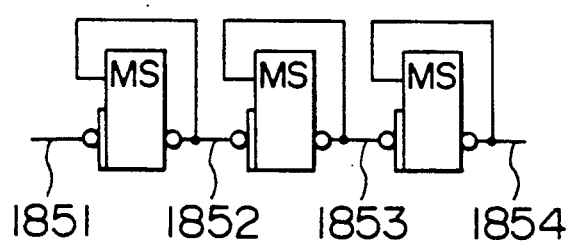
FIGS. 22, 23 and 24 are diagrams indicating circuits used as parts for realizing the present invention.
Figure 23:
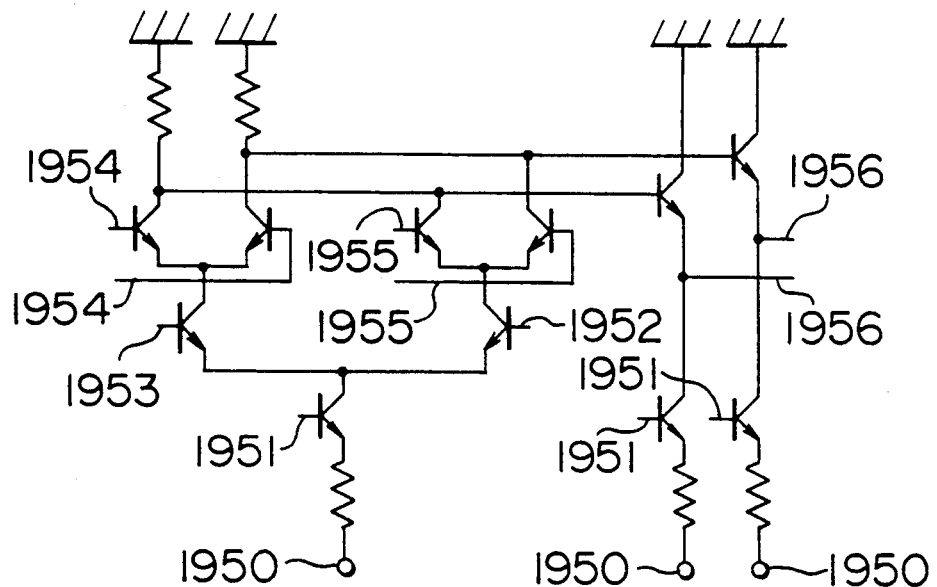
Figure 24:
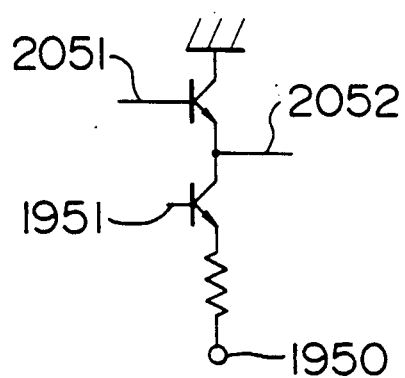

FIGS. 22, 23 and 24 show circuit constructions used in some embodiments of the present invention. Although they are well-known circuits, they will be explained below for the sake of convenience. FIG. 22 indicates a circuit used for the frequency divider 15 in FIG. 2 or 17, in which the frequency of a signal inputted through a terminal 1851 is divided by 2 every time it passes through a master-slave type flipflop. Thus, the frequency of the signal at a terminal 1852 is a half of that at the terminal 1851; that obtained at a terminal 1853 is a quarter thereof; and that obtained at a terminal 1854 is one eighth thereof. The circuit indicated in FIG. 23 is the selector used in the circuit indicated in FIG. 4 or 19, in which a signal outputted through a terminal 1956 is a signal inputted through a terminal 1954 when a high level signal is inputted through a terminal 1953, and it is a signal inputted through another terminal 1955 when a low level signal is inputted through the terminal 1953. Further, the selector selecting one among more than 3 signals, as indicated by 1701 in FIG. 21, can be realized by disposing a plurality of the circuits indicated in FIG. 23. For example, in the case where one is selected among 4 signals A, B, C and D, a first selector selects one of A and B; a second selector selects one of C and D; a third selector selects either one of the output of the first selector and the output of the second selector. A selector selecting one of the 4 signals A, B, C and D can be realized by constructing it so as to work as described above. FIG. 24 shows a level shift circuit used in the circuit indicated in FIG. 18A, in which a voltage inputted through a terminal 2051 is transformed into a voltage, which is lower by a voltage between the base and the emitter of a transistor than the inputted voltage, and appears at a terminal 2052.

What is claimed is:

1. A clock signal supplying device comprising:
   a clock signal generator for generating an original clock signal;
   first signal transmitting means for transmitting a first plurality of signals which correspond to said original clock signal;
   a plurality of variable delay circuits respectively connected to receive said first plurality of signals after said first plurality of signals have passed through said first signal transmitting means, said variable delay circuits respectively outputting said first plurality of signals to distribution destinations after having respectively adjusted the phases of said first plurality of signals;
   means for generating a phase reference signal based on said original clock signal;
   second signal transmitting means for transmitting a second plurality of signals which correspond to said phase reference signal;
   a plurality of phase comparing circuits respectively connected to receive said first plurality of signals and respectively connected to receive said second plurality of signals after said second plurality of signals have passed through said second transmitting means, said phase comparing circuits respectively outputting signals indicating one of a phase advance and phase retard based on the phase difference between the two signals received by each phase comparing circuit;
   a plurality of delay control circuits for issuing outputs for varying phase regulation amounts in each of said variable delay circuits in response to the output signals of said phase comparing circuits in order to reduce the phase difference between the signals received by each phase comparing circuit; and
   error preventing means respectively connected to receive the outputs of said phase comparing circuits, each of said error preventing means being disposed between one of said phase comparing circuits and one of said delay control circuits so that when the respective output signals of said phase comparing circuits are received by said error preventing means, each of said error preventing means detects the number of signals indicating a phase advance and the number of signals indicating a phase retard, and so that when a ratio between the number of signals indicating the phase advance and the number of signals indicating the phase retard exceeds a predetermined value, each of said error preventing means effects modification of the phase regulation amount in a corresponding variable delay circuit.

2. A clock signal supplying device according to claim 1, wherein said error preventing means includes counting circuits counting the number of signals indicating the phase advance and the number of signals indicating the phase retard, respectively.

3. A clock signal supplying device according to claim 1, wherein each of said variable delay circuits is provided with a plurality of delay elements having different delay amounts and includes selector circuits for selecting said delay elements based on outputs from said error preventing means responding to the output signals of said phase comparing circuits.

4. A clock signal supplying device according to claim 3, wherein the output of each delay control circuit is a digital signal which varies bit by bit, and said selector circuits are controlled by said digital signals.

5. A clock signal supplying device according to claim 4, wherein each delay control circuit includes an UP-/DOWN circuit which causes the output of each delay control circuit to vary bit by bit based on outputs from said error preventing means responding to the output signals of said phase comparing circuits.

6. A clock signal supplying device according to claim 5, wherein each delay control circuit includes means for generating an output which causes a selector circuit to select a delay element having a large amount of delay at the beginning of a control based on outputs from said error preventing means responding to the output signals of said phase comparing circuits.

7. A clock signal supplying device comprising:
a clock signal generator for generating an original clock signal;
first signal transmitting means for transmitting a first plurality of signals which correspond to said original clock signal;
a plurality of variable delay circuits respectively connected to receive said first plurality of signals after said first plurality of signals have passed through said first signal transmitting means, said variable delay circuits respectively outputting said first plurality of signals to distribution destinations after having respectively adjusted the phases of said first plurality of signals;
means for generating a phase reference signal based on said original clock signal;
second signal transmitting means for transmitting a second plurality of signals which correspond to said phase reference signal;
a plurality of phase comparing circuits respectively connected to receive said first plurality of signals and respectively connected to receive said second plurality of signals after said second plurality of signals have passed through said second transmitting means, said phase comparing circuits respectively outputting signals indicating one of a phase advance and phase retard based on the phase difference the two signals received by each phase comparing circuit;
a plurality of delay control circuits for issuing outputs for varying phase regulation amounts in each of said variable delay circuits in response to the output signals of said phase comparing circuits in order to reduce the phase difference between the signals received by each phase comparing circuit; and
holding means for fixing the output signal of each of said delay control circuits when the varying of the amounts of the phase regulation in each of said variable delay circuits is terminated.

8. A clock signal supplying device according to claim 7, wherein said holding means includes a timer for providing each delay control circuit with a signal for fixing the output of each delay control circuit after a predetermined period of time measured from the beginning of the operation of that delay control circuit.

9. A clock signal supplying device according to claim 8, further comprising error preventing means respectively connected to receive the outputs of said phase comparing circuits, each of said error preventing means being disposed between one of said phase comparing circuits and one of said delay control circuits so that when the respective output signals of said phase comparing circuits are received by said error preventing means, each of said error preventing means detects the number of signals indicating a phase advance and the number of signals indicating a phase retard, and so that when a ratio between the number of signals indicating the phase advance and the number of signals indicating the phase retard exceeds a predetermined value, each of said error preventing means effects modification of the phase regulation amount in a corresponding variable delay circuit.

10. A clock signal supplying device comprising:
a clock signal generator for generating an original clock signal;
first signal transmitting means for transmitting a first plurality of signals which correspond to said original clock signal;
a plurality of variable delay circuits respectively connected to receive said first plurality of signals after said first plurality of signals have passed through said first signal transmitting means, said variable delay circuits respectively outputting said first plurality of signals to distribution destinations after having respectively adjusted the phases of said first plurality of signals;
a plurality of frequency dividing circuits for respectively dividing the first plurality of signals output from said variable delay circuits in order to respectively output clock signals having a plurality of phases;
second signal transmitting means for transmitting a second plurality of signals which correspond to said phase reference signal;
a plurality of phase comparing circuits respectfully connected to receive the clock signals output by said frequency dividing circuits and respectively connected to receive said second plurality of signals after said second plurality of signals have passed through said second transmitting means, said phase comparing circuits respectively outputting signals indicating one of a phase advance and a phase retard based on the phase difference between the two signals received by each phase comparing circuit;
a plurality of delay control circuits for issuing outputs for varying phase regulation amounts in each of sid variable delay circuits in response to the output signals of said phase comparing circuits in order to reduce the phase difference between the two signals received by each phase comparing circuit; and a plurality of shifter circuits for phase shifting the second plurality of signals after said second plurality of signals have passed through said second transmitting means and for respectively outputting the phase shifted signals, said phase shifted signals respectively outputted by said plurality of shifter circuits synchronizing said frequency dividing circuits with each other.

11. A clock signal supplying device according to claim 10, wherein each shifter circuit includes means for generating a synchronizing signal for said frequency dividers based on either one of a rising edge and a falling edge of one of said second plurality of signals which has passed through said second signal transmitting means.

12. A clock signal supplying device according to claim 11, wherein there is disposed further selector means between each shifter circuit and each of said frequency dividers which receives an output of said frequency divider and an output of said shifter circuit, said selector means providing said frequency divider with the output of said shifter circuit while a corresponding variable delay circuit is in the course of performing phase regulation, and the output of said frequency divider is relayed back to said frequency divider itself as a synchronizing signal when said corresponding variable delay circuit has terminated the phase regulation.

13. A clock signal supplying device according to claim 12, further comprising error preventing means respectively connected to receive the outputs of said phase comparing circuits, each of said error preventing means being disposed between one of said phase comparing circuits and one of said delay control circuits so that when the respective output signals of said phase comparing circuits are received by said error preventing means, each of said error preventing means detects the number of signals indicating a phase advance and the number of signals indicating a phase retard, and so that when a ratio between the number of signals indicating the phase advance and the number of signals indicating the phase retard exceeds a predetermined value, each of said error preventing means effects modification of the phase regulation amount in a corresponding variable delay circuit.

14. A system for distributing a clock signal from a clock signal source to devices which utilize the clock signal, wherein:
said clock signal source includes a clock generator for generating an original clock signal and means for generating a phase reference signal based on said original clock signal;
said devices comprise a plurality of modules connected to said clock signal source through first transmitting means for transmitting a plurality of signals which correspond to said original clock signal and second signal transmitting means for transmitting a second plurality of signals which correspond to said phase reference signal;
each of said modules comprises a plurality of variable delay circuits respectively connected to receive said first plurality of signals after said first plurality of signals have passed through said first transmitting means, said variable delay circuits respectively outputting said first plurality of signals to distribution destinations after having respectively adjusted the phases of said first plurality of signals, a plurality of phase comparing circuits respectively connected to receive said first plurality of signals and respectively connected to receive said second plurality of signals after said second plurality of signals have passed through said second transmitting means, said phase comparing circuits respectively outputting signals indicating one of a phase advance and a phase retard based on the phase difference between the two signals received by each phase comparing circuit, and a plurality of delay control circuits for issuing outputs for varying phase regulation amounts in each of said variable delay circuits in response to the output signals of said phase comparing circuits in order to reduce the phase difference between the two signals received by each phase comparing circuit; and
each of said modules comprises a plurality of LSI chips, said phase comparing circuits of each module being disposed within a single LSI chip within each module.

15. A system according to claim 14, further comprising error preventing means respectively connected to receive the outputs of said phase comparing circuits, each of said error preventing means being disposed between one of said phase comparing circuits and one of said delay control circuits so that when the respective output signals of said phase comparing circuits are received by said error preventing means, each of said error preventing means detects the number of signals indicating a phase advance and the number of signals indicating a phase retard, and so that when a ratio between the number of signals indicating the phase advance and the number of signals indicating the phase retard exceeds a predetermined value, each of said error preventing means effects modification of the phase regulation amount in a corresponding variable delay circuit.

16. A system according to claim 15, wherein each of said modules is constructed so that all the phase comparing circuits of each module are disposed in a a single LSI chip and there are disposed in each module a number of said phase comparing circuits which is equal to the number of LSI chips in each modules, each of said variable delay circuits being disposed in one of the LSI chips in each module.

17. A system according to claim 15, wherein each of said modules is constructed so that a common phase comparing circuit and a common variable delay circuit are disposed in a single LSI chip in each module and a phase regulated clock signal is distributed from said common variable control circuit to the remaining LSI chips within each module.

18. A system according to claim 15, wherein said clock signal source further comprises a frequency divider which divides the frequency of the clock signal generated by said clock signal generator to output clock signals having a plurality of phases in order to supply said output said output clock signals to said first signal transmitting means;
means for forming a phase reference signal based on the original clock signal generated by said clock signal source; and
selector means for supplying said second plurality of clock signals corresponding to said phase reference signal in a time sharing manner to said modules through said second signal transmitting means.

19. A device according to any one of claims 1-13, further comprising: a plurality of second variable delay circuits respectively connected to receive said second plurality of signals corresponding to the phase reference signal to respectively adjust the phase of said second plurality of signals; means for detecting a point in time where each of the second plurality of signals corresponding to said phase reference signal which have been transmitted from said second variable delay circuits to said second signal transmitting means passes through a respective predetermined reference point, and a point of time where each of the second plurality of signals corresponding to said phase reference signal transmitted through said second signal transmitting means and reflected at an extremity thereof returns to said respective predetermined reference point; and means for varying a delay amount in each second variable delay circuit in response to the difference between said two points in time detected at said respective predetermined point.

20. A system according to any of claims 14-18 further comprising:

means for detecting the temperature of each LSI chip and for outputting a signal corresponding to said detected temperature; and means for controlling a delay amount in each variable delay circuit in response to an output of said temperature detecting means.

21. A device according to claim 19, further comprising:

means for detecting the temperature of each LSI chip and for outputting a signal corresponding to said detected temperature; and means for controlling a delay amount in each variable delay circuit in response to an output of said temperature detecting means.

22. A system for distributing a clock signal from a clock signal source to devices which utilize the clock signal, wherein:

said clock signal source includes a clock generator for generating an original clock signal and means for generating a phase reference signal based on said original clock signal;

said devices comprise a plurality of modules connected to said clock signal source through first transmitting means for transmitting a plurality of signals which correspond to said original clock signal and second signal transmitting means for transmitting a second plurality of signals which correspond to said phase reference signal;

said system comprises variable delay means respectively connected to receive said second plurality of signals to respectively adjust the phase of said second plurality of signals, means for detecting a point in time where each of the second plurality of signals corresponding to said phase reference signal which have been transmitted from said variable delay means to said second signal transmitting means passes through a respective predetermined reference point, and a point of time where each of the second plurality of signals corresponding to said phase reference signal transmitted through said second signal transmitting means and reflected at an extremity thereof returns to said respective predetermined reference point, and means for varying a delay amount in each variable delay means in response to the difference between said two point in time detected at said respective predetermined point;

each of said modules comprises a plurality of variable delay circuits respectively connected to receive said first plurality of signals after said first plurality of signals have passed through said first transmitting means, said variable delay circuits respectively outputting said first plurality of signals to distribution destinations after having respectively adjusted the phases of said first plurality of signals, a plurality of phase comparing circuits respectively connected to receive said first plurality of signals and respectively connected to receive said second plurality of signals after said second plurality of signals have passed through said second transmitting means, said phase comparing circuits respectively outputting signals indicating one of a phase advance and a phase retard based on the phase difference between the two signals received by each phase comparing circuit, and a plurality of delay control circuits for issuing outputs for varying phase regulation amounts in each of said variable delay circuits in response to the output signals of said phase comparing circuits in order to reduce the phase difference between the two signals received by each phase comparing circuit; and each of said modules comprises a plurality of LSI chips, said phase comparing circuits of each module being disposed within a signal LSI chip within each module.

23. A system according to claim 22, further comprising: means for detecting the temperature of each LSI chip and for outputting a signal corresponding to said detected temperature; and means for controlling a delay amount in each variable delay circuit in response to an output of said temperature detecting means.

* * * * *